(12) United States Patent
Kanda

(10) Patent No.: US 6,806,882 B2
(45) Date of Patent: Oct. 19, 2004

(54) METHOD OF AND APPARATUS FOR FORMING IMAGE

(75) Inventor: Yoshimichi Kanda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 209 days.

(21) Appl. No.: 10/100,916

(22) Filed: Mar. 20, 2002

(65) Prior Publication Data

US 2002/0138697 A1 Sep. 26, 2002

(30) Foreign Application Priority Data

Mar. 21, 2001 (JP) ........................................ 2001-081630
Jan. 31, 2002 (JP) ........................................ 2002-024413

(51) Int. Cl.[7] ................................................. G09G 5/39
(52) U.S. Cl. ....................... 345/532; 345/536; 711/112; 711/114
(58) Field of Search ................................ 345/532, 536, 345/537; 711/4, 111, 112, 114

(56) References Cited

U.S. PATENT DOCUMENTS

| 4,797,755 A | * | 1/1989 | Baldwin et al. ............... 360/49 |
| 4,811,281 A | * | 3/1989 | Okamoto et al. ........... 345/502 |
| 5,321,816 A | * | 6/1994 | Rogan et al. ................. 705/42 |
| 5,485,535 A | * | 1/1996 | Arimoto ..................... 382/305 |
| 5,519,849 A | * | 5/1996 | Malan et al. ................ 711/114 |
| 6,098,121 A | * | 8/2000 | Furuya ......................... 710/24 |

FOREIGN PATENT DOCUMENTS

JP          10-326154          10/1998

* cited by examiner

Primary Examiner—Matthew C. Bella
Assistant Examiner—Mackly Monestime
(74) Attorney, Agent, or Firm—Oblon, Spivak, McClelland, Maier & Neustadt, P.C.

(57) ABSTRACT

The image formation apparatus comprises a plurality of hard disk drives which store image data and a hard disk drive array control integrated circuit which controls reading/writing of image data from/into the hard disk drives. The hard disk drive array control integrated circuit executes setting of parameters, issuance of commands, and reading of statuses for all the hard disk drives substantially at the same time, divides the image data into pieces, and executes direct memory access transfer of the pieces of the image data to the hard disk drives substantially at the same time.

18 Claims, 12 Drawing Sheets

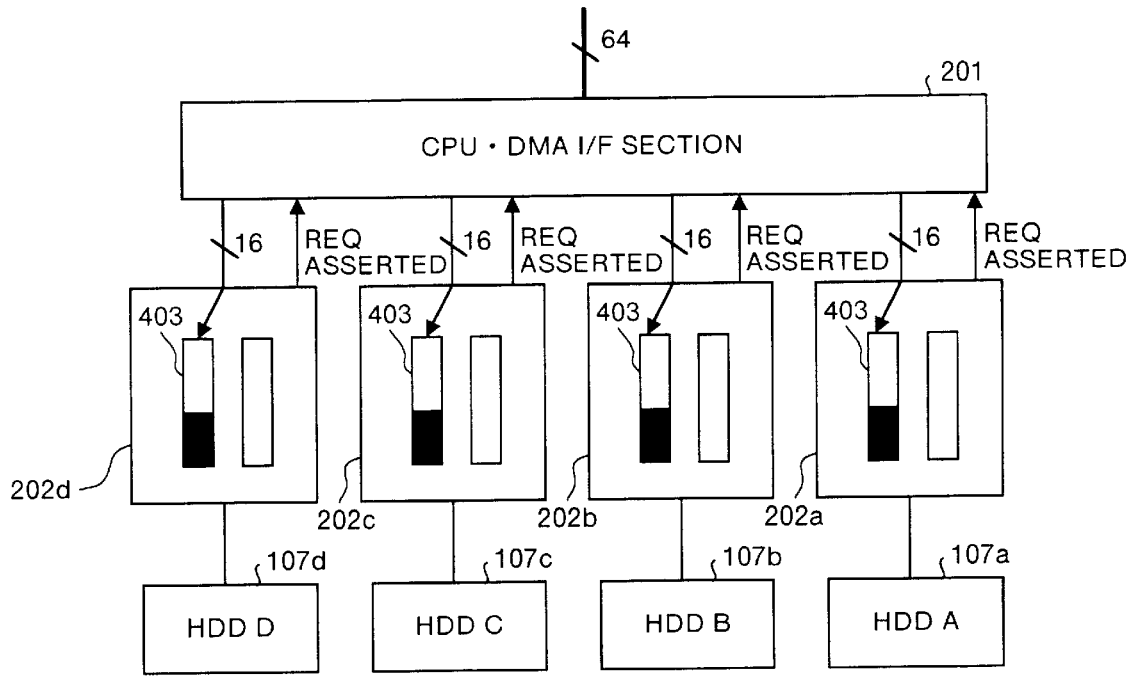
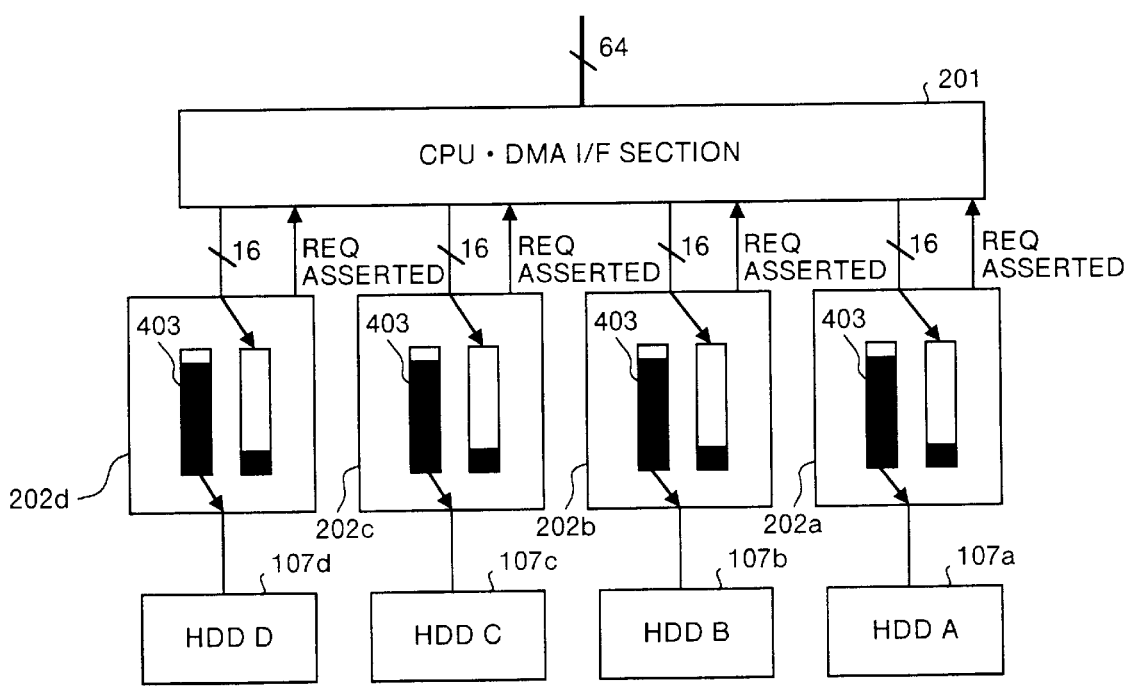

METHOD OF AND APPARATUS FOR FORMING IMAGE

FIELD OF THE INVENTION

The present invention relates to a method of and an apparatus for forming image(s) comprising a hard disk controller that operates a plurality of hard disk drives (HDD's) in parallel, to rapidly read/write enormous amounts of data, such as image data processed with an electronic filing system.

BACKGROUND OF THE INVENTION

It has been know that storage device arrays including a plurality of storage devices such as HDD's that are operated in parallel, allow fast reading/writing of data. A conventional storage device array has an array controller, which works as a control section, and which may be provided in a form of an expansion board connected to a bus in a personal computer.

The array controller in the form of an expansion board is inserted in an expansion slot of the personal computer, and connected to a group of storage devices to be controlled. The array controller controls the group of storage devices according to instructions sent from the personal computer. The array controller reads/writes blocks of data from/into different drives of the group of storage devices, while changing the drive to be read/written from/into block by block.

FIG. 19 illustrates an example of how a conventional array controller (hard disk controller) writes data into a plurality of HDD's. In this example, 96 kilobytes (KB) of data are written into four HDD's, block by block, each block having a size of 16 KB.

As shown in FIG. 19, the data are divided and written into the different discs in sequence starting from the first 16 KB block of data into a disc 0. After the fourth block is written into a disc 4, the next block is written into the disc 0, and so on. In general, HDD's are each provided with a data buffer having a capacity of 16 KB or more such that data to be transferred can be stored in the data buffer first before they are written into the disk. Accordingly, data can be written into different HDD's in sequence, such that a block of data is written into an HDD while another block of data is being transferred to another HDD from a data buffer inside. As a result, fast data transfer can be achieved.

Such a method of dividing data into different HDD's is disclosed in the Japanese Laid Open Paten Application No. 10-326154 titled "Array controller and data server". However, the configuration of the array controller disclosed in this application is rather complex. That is, a special central processing unit (CPU) is required for the array controller, and it is required that hard disks are specially controlled with software that analyzes commands on the bus.

Some of the present day image formation apparatuses such as digital copiers are provided with a plurality of HDD's. Development of hard disk controllers to be used in such image formation apparatuses are in great demand, the hard disk controllers which can transfer image data to the plurality of HDD's fast and control the HDD's efficiently.

SUMMARY OF THE INVENTION

It is an object of the present invention to provide a method of and an apparatus for forming image(s) comprising a simply configured hard disk controller that can transfer image data to a plurality of HDD's fast, and control the plurality of HDD's efficiently as a single HDD.

It is another object of the invention to provide a method of and an apparatus for forming image(s), comprising a hard disk controller, which can specify an HDD out of a plurality of HDD's, the HDD in which a malfunction has occurred.

It is still another object of the invention to provide a method of and an apparatus for forming image(s), comprising a hard disk controller, which can specify an HDD out of a plurality of HDD's, the HDD in which a decrease in its transfer rate has been caused.

It is yet anther object of the invention to provide a method of and an apparatus for forming image(s), comprising a hard disk controller, which can specify an HDD out of a plurality of HDD'S, the HDD in which a decrease in its transfer rate has been caused by factors other than emergent disturbances such as vibrations.

The image formation apparatus according to the present invention comprises an input unit which acquires an image data, a central processing unit which controls an overall operation of the apparatus, a plurality of hard disk drives which store the image data, a memory which stores at least one page of the image data, a direct memory access controller which controls reading/writing of the image data from/into the memory, a hard disk controller which sends/receives the image data to/from the direct memory access controller when reading/writing the image data from/into the memory and controls reading/writing of image data from/into the hard disk drives, and an image formation unit which forms an image based on the image data. In the method of and apparatus for image formation according to the present invention, the hard disk controller controls setting of parameters, issuance of commands, and reading of statuses for the hard disk drives substantially at the same time, divides the image data into a plurality of pieces, and executes direct memory access transfer of the pieces of the image data to the hard disk drives substantially at the same time.

Other objects and features of this invention will become apparent from the following description with reference to the accompanying drawings.

BRIEF DESCRIPTION OF THE DRAWINGS

FIG. 10 is a diagram, which illustrates an example of transfer of image data using "first in, first out" (FIFO) memories, FIG. 11 is a diagram, which illustrates another example of transfer of image data using FIFO memories.

DETAILED DESCRIPTIONS

Embodiments of a method of and an apparatus for forming image(s) according to the present invention will now be explained in detail while referring to the accompanying drawings.

Figure 1:
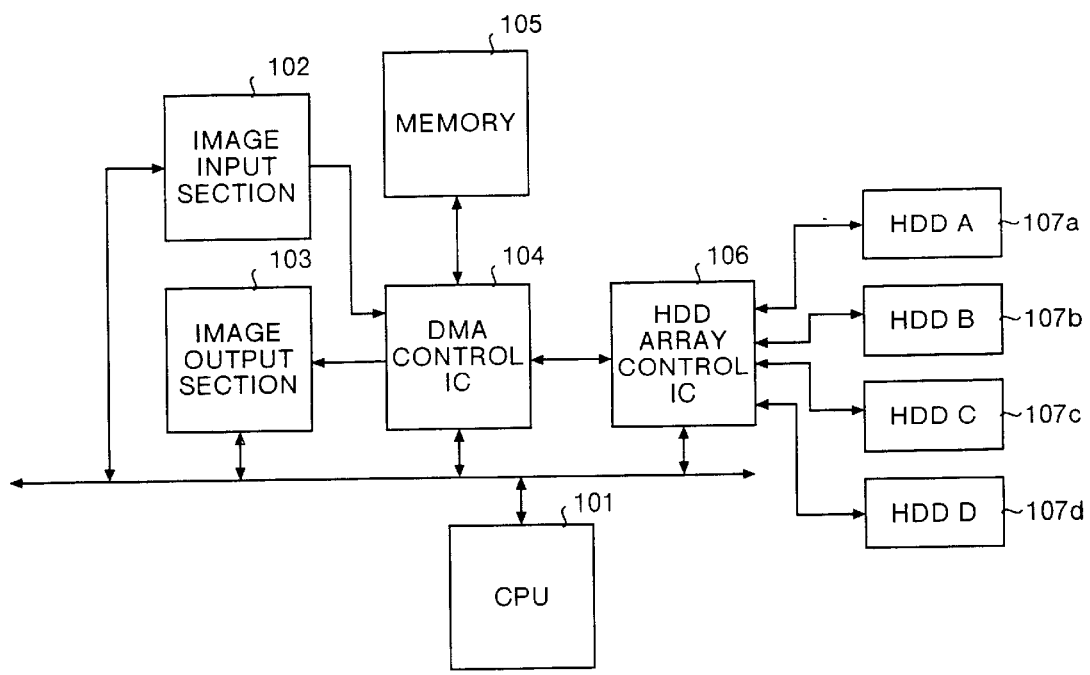
FIG. 1 is a block diagram, which illustrates a configuration of the image formation apparatus according to the present invention.

The image formation apparatus according to a first embodiment will be explained while referring to FIGS. 1 to 12. FIG. 1 is a block diagram, which shows a configuration of the image formation apparatus according to the first embodiment. The apparatus comprises a CPU 101, an image input section 102, an image output section 103, a direct memory access control integrated circuit (DMA control IC or DMA controller) 104, a memory 105, an HDD array control IC (hard disk controller) 106 and four HDD A 107a to HDD D 107d complying with the ATA standard. The CPU 101 controls an overall operation of the image formation apparatus. The image input section 102 includes an automatic document feeder (ADF) and a scanner, and reads image data from documents. The image output section 103 prints out the image data, on sheets of paper using electrophotography. The direct memory access control integrated circuit (DMA control IC or DMA controller) 104 controls reading/writing of image data from/into the memory 105 and the memory 105 stores at least one page of image data and for example may be a dynamic random access memory (DRAM). The HDD array control IC (hard disk controller) 106 controls reading/writing of image data from/into the four HDD A 107a to HDD D 107d which store image data. The HDD A 107a to HDD D 107d all have the same configuration.

Operation of the image formation apparatus normally performed when obtaining a copy of a document ("normal copying operation") will now be explained. When the CPU 101 generates an instruction to start a normal copying operation, the image input section 102 reads image data of one page of the document and transfers the read-out image data to the DMA control IC 104. The DMA control IC 104 first stores the image data into the memory 105, i.e. before transferring the image data to the image output section 103. The image output section 103 outputs the image data by printing them onto a transfer paper.

Figure 2:
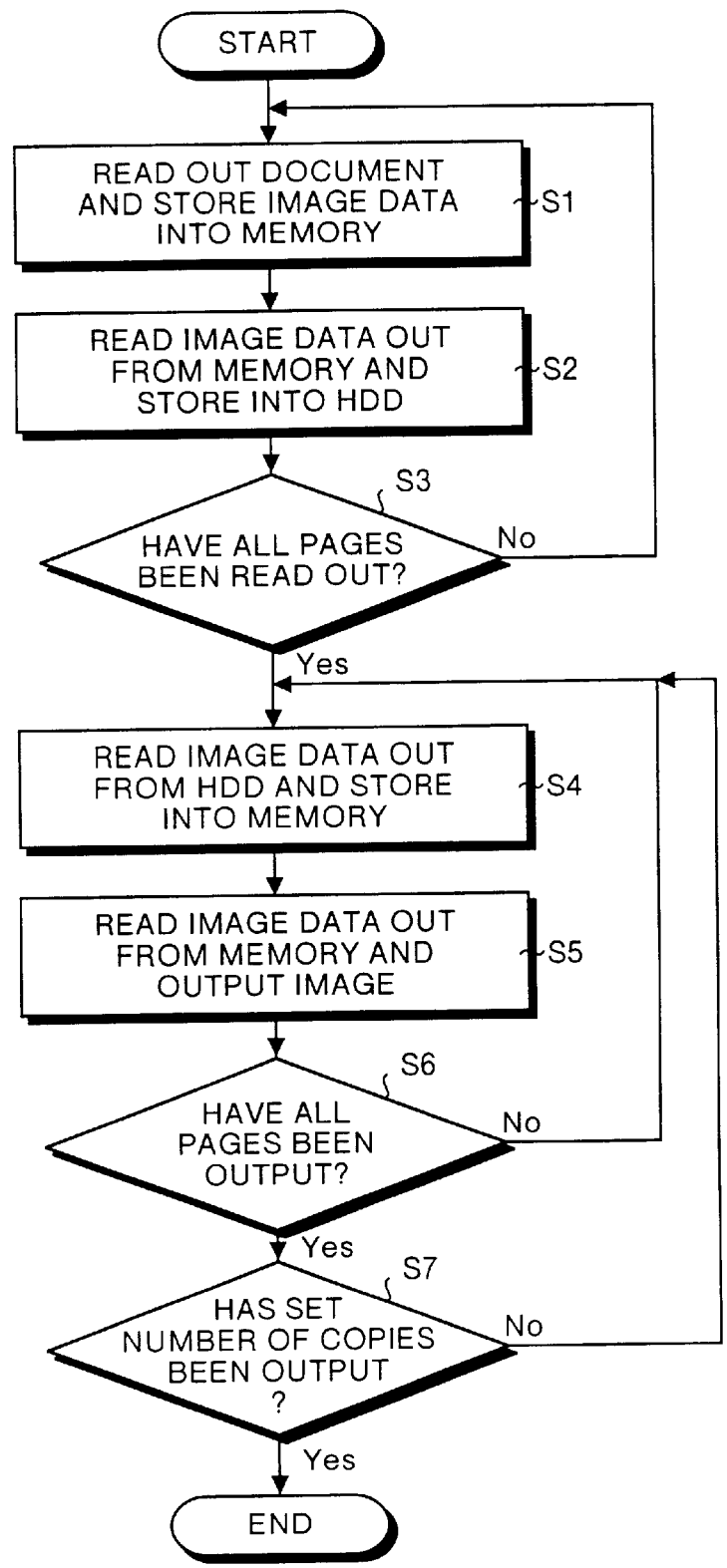
FIG. 2 is a flowchart, which represents a copying operation using an electronic sorting function of the image formation apparatus shown in FIG. 1.

Operation of the image formation apparatus normally performed when obtaining a copy of a document using an electronic sorting function of the image formation apparatus will now be explained while referring to FIG. 2. FIG. 2 is a flowchart, which shows the copying operation using the electronic sorting function of the image formation apparatus.

As shown in FIG. 2, when the CPU 101 generates an instruction to start the copying operation using the electronic sorting, the image input section 102 reads image data from one page of document and transfers the image data to the DMA control IC 104. The DMA control IC 104 stores the image data into the memory 105 first (step S1) and then reads out the image data stored in the memory 105 to transfer the image data to the HDD array control IC 106. The HDD array control IC 106 stores the image data into the HDD A 107a to HDD D 107d (step S2). In step S2, the image data in the memory 105 is divided and DMA transferred at the same time into the HDD A 107a to HDD D 107d from the DMA control IC 104 via the HDD array control IC 106 (see FIG. 9).

Next, the CPU 101 determines whether reading of all pages of the document has been completed or not (step S3). If all the pages have been read, the CPU 101 proceeds to step S4, and if not, the CPU 101 repeats steps S1 to S3 until all the pages have been read.

The HDD array control IC 106 then reads out the image data stored in the HDD A 107a to HDD D 107d and transfers the image data to the DMA control IC 104. The DMA control IC 104 then stores the image data into the memory 105 (step S4) and sends the image data to the image output section 103 that outputs the image data by printing them onto a transfer paper (step S5). The CPU 101 then determines whether output of images of all the pages has been completed or not (step S6). If it has been completed, the CPU 101 proceeds to step S7, and if not, the CPU 101 repeats steps S4 to S6 until all is output.

When the images of all the pages have been output, the CPU 101 determines whether a set number of prints have been output or not, in step S7. If the set number of copies have been output, the flow of the copying operation ends and if not, the CPU 101 repeats steps S4 to S7 until the set number of copies of the images are output.

A configuration and an operation of the HDD array control IC (hard disk controller) 106 which is a characteristic feature of the present invention will now be explained in detail while referring to FIGS. 3 to 12. The HDD array control IC 106 sets commands and transfers image data to the HDD A 107a to HDD D 107d at the same time among the HDD's.

Figure 3:
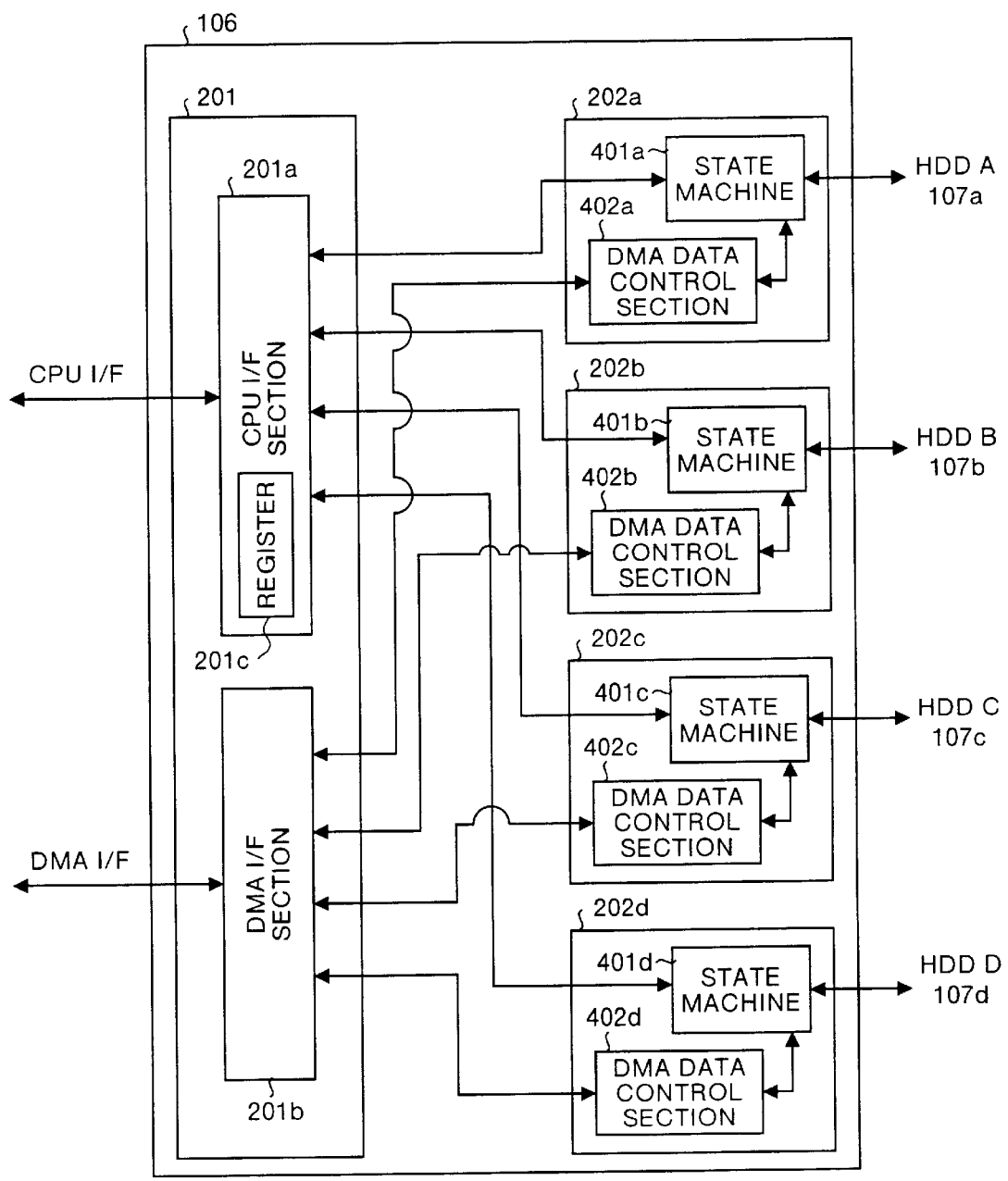
FIG. 3 is a block diagram, which illustrates an internal configuration of the HDD array control integrated circuit shown in FIG. 1.

FIG. 3 is a block diagram, which shows a configuration of the HDD array control IC 106 shown in FIG. 1. The HDD array control IC 106 comprises a central processing unit-direct memory access interface (CPU-DMA I/F) section 201 and HDD interfaces HDD I/F A 202a to HDD I/F D 202d. The CPU-DMA I/F section 201 works as an interface between the CPU 101 and the DMA control IC 104. The HDD I/F A 202a to HDD I/F D 202d each receives a command and the image data sent from the CPU-DMA I/F section 201 and independently transfers them to the respective one of the HDD A 107a to HDD D 107d. The HDD I/F A 202a to HDD I/F D 202d all have the same configuration.

The CPU-DMA I/F section 201 comprises a CPU I/F section 201a and a DMA I/F section 201b. The CPU I/F section 201a interfaces between the CPU 101 and the HDD I/F's, and includes a register 201c that can be read/written out/into by the CPU 101. The CPU I/F section 201a decodes the commands and parameters that have been set by the CPU 101 in the register 201c, to instruct generation of signals that command reading/writing from/into the HDD A 107a to HDD D 107d and initiation of DMA. The DMA I/F section 201b interfaces between the DMA control IC 104 and the HDD I/F's. The DMA I/F section 201b transfers imaged at a to the DMA data control sections 402a to 402d, when all the DMA data control sections 402a to 402d are ready to receive data, after accumulating the image data which are worth a number of words (an amount of data) transferable to the HDD A 107a to HDD D 107d.

Each of the HDD I/F A 202a to HDD I/F D 202d comprises a corresponding one of state machines 401a to 401d, and a corresponding one of DMA data control sections 402a to 402d. When the state machines 401a to 401d receive from the CPU I/F section 201a, an instruction to write commands into the HDD's or read statuses of the HDD's, the state machines 401a to 401d generate access signals for the HDD A 107a to HDD D 107d. When the state machines 401a to 401d receive an instruction to start DMA they interface between the DMA data control sections 402a to 402d and the HDD A 107a to HDD D 107d, and generates interface signals for the HDD's to execute DMA transfer of image data. When the state machines 401a to 401d then receive from the DMA I/F 201b, a trigger signal RTRG that instructs to start data transfer, the state machines 401a to 401d respectively transfer image data to the HDD A 107a to HDD D 107d.

The DMA data control sections 402a to 402d interface between the DMA I/F section 201b and the state machines. The DMA data control sections 402a to 402d each comprises a pair of toggle "first in, first out" (FIFO) memories (buffer) 403 inside for storing the image data transferred from the DMA I/F section 201b. The DMA data control sections 402a to 402d store the image data to be written into the HDD A 107a to HDD B 107b, into the pairs of FIFO memories (buffer) 403 and transfer the image data to the HDD A 107a to HDD B 107b.

Figure 4:
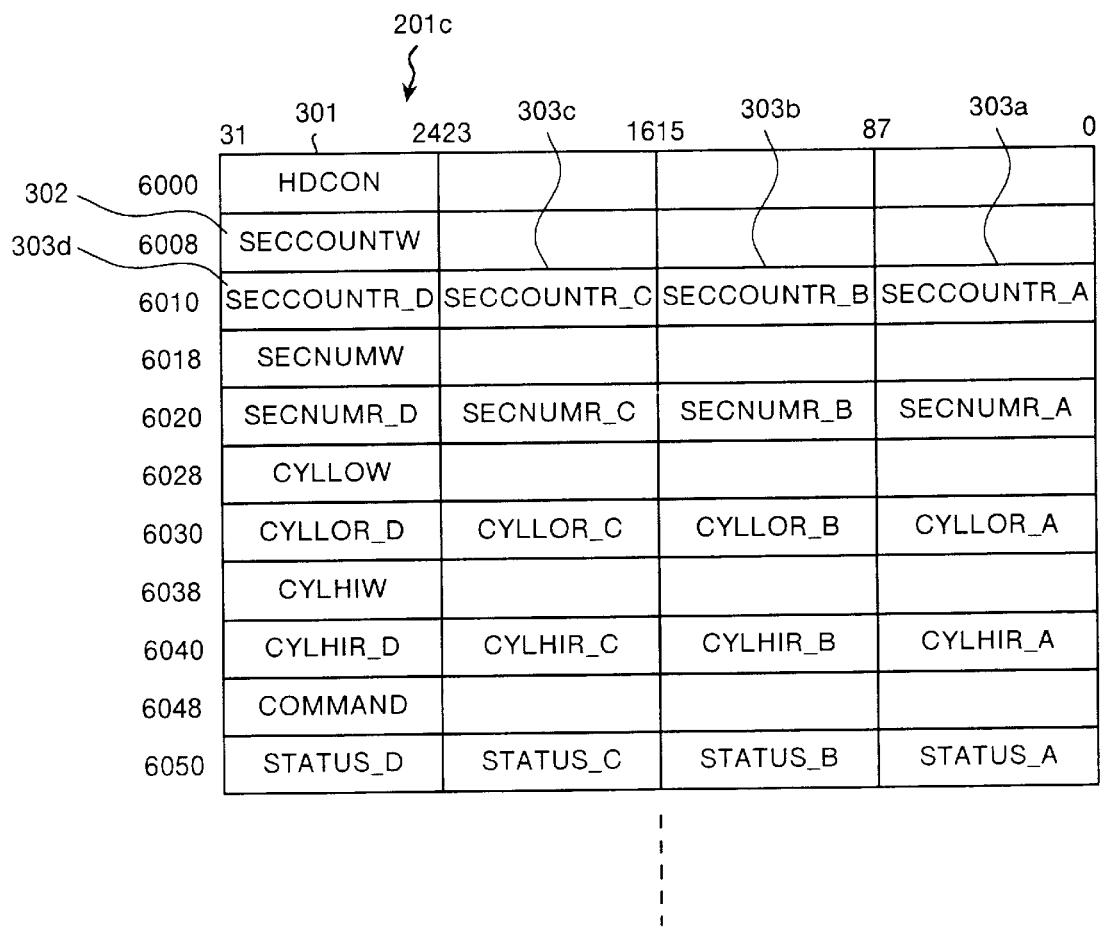
FIG. 4 is diagram, which illustrates a configuration of the register shown in FIG. 3.

FIG. 4 shows an example of a configuration of the register 201c in the CPU I/F section 201 shown in FIG. 3. The register 201c comprises a register HDCON 301 from/into which the CPU 101 reads/writes a setting of the HDD array control IC 106, and write registers (i.e. registers dedicated for writing) SECCOUNTW 302, SECNUMW, CYLLOW, CYLHIW and COMMAND specially available to be written into by the CPU 101 and common to all the HDD A 107a to HDD D 107d. The register 201c further comprises read registers (i.e. registers dedicated for reading) SECCOUNT_A 303a to SECCOUNT D 303d, SECNUMR_A to D, CYLLOR_A to D, CYLHIR_A to D, and STATUS_A to D, specially available to be read by the CPU 101, and which are provided respectively for each of the HDD A 107a to HDD D 107d.

The CPU 101 writes one value in the respective write register when the CPU 101 issues a command or writes a parameter for the HDD A 107a to HDD D 107d. Accordingly, the CPU I/F section 201a then issues the value that has been written in the write register, to all the HDD A 107a to HDD D 107d at the same time. The CPU I/F section 201a also writes values read out from the HDD A 107a to HDD D 107d at the same time, the values corresponding to statuses or parameters of the HDD's and to be referred to by the CPU 101, into the respective read registers. The write registers are designed such that one value can be written in each to execute setting of a command or a parameter for the HDD A 107a to HDD D 107d at the same time. On the contrary, since different values may be read out individually from the HDD A 107a to HDD D 107d, the read registers are designed such that four values can be read out from the HDD's at the same time.

The size of each register is 4 bytes. In FIG. 4, an address 6000 represents the register HDCON 301 for setting the HDD array control IC 106, and an address 6008 represents the register SECCOUNTW 302 for setting a number of sectors of data to be transferred (SECCOUNT), the number which is to be written into sector count registers of the HDD A 107a to HDD D 107d. Further, an address 6010 represents the registers SECCOUNTR_A 303a to SECCOUNTER_D 303d into which numbers of sectors of data transferred are written, the numbers which has been read out from the sector count registers of the HDD A 107a to HDD D 107d. The CPU 101 can read out these numbers written into the registers SECCOUNTR_A 303a to SECCOUNTER_D 303D.

Registers in addresses 6018 to 6040 relate to address settings inside the HDD's. The address 6018 represents the register SECNUMW into which a sector number is written, and the address 6020 represents the registers SECNUMR_A to D from which sector numbers are read out. The address 6028 represents the register CYLLOW into which a cylinder number LOW is written, and the address 6030 represents the registers CYLLOR_A to D from which cylinder numbers LOW's are read out. The address 6038 represents the register CYLHIW into which a cylinder number HIGH is written, and the address 6040 represents the registers CYLHIR_A to D from which cylinder numbers HIGH's are read out.

An address 6048 represents the register COMMAND from which a command instructing data transfer for example is issued to the HDD A 107a to HDD D 107d. Since only writing of the command into the HDD's is executed, there are no registers for reading a command from the HDD's. An address 6050 represents the registers STATUS_A to D into which status values read out from the HDD A 107a to HDD D 107d are written. Since only reading of the statuses of the HDD A 107a to HDD D 107d by the CPU 101 is executed, there is no register for writing in the status.

Figure 5:
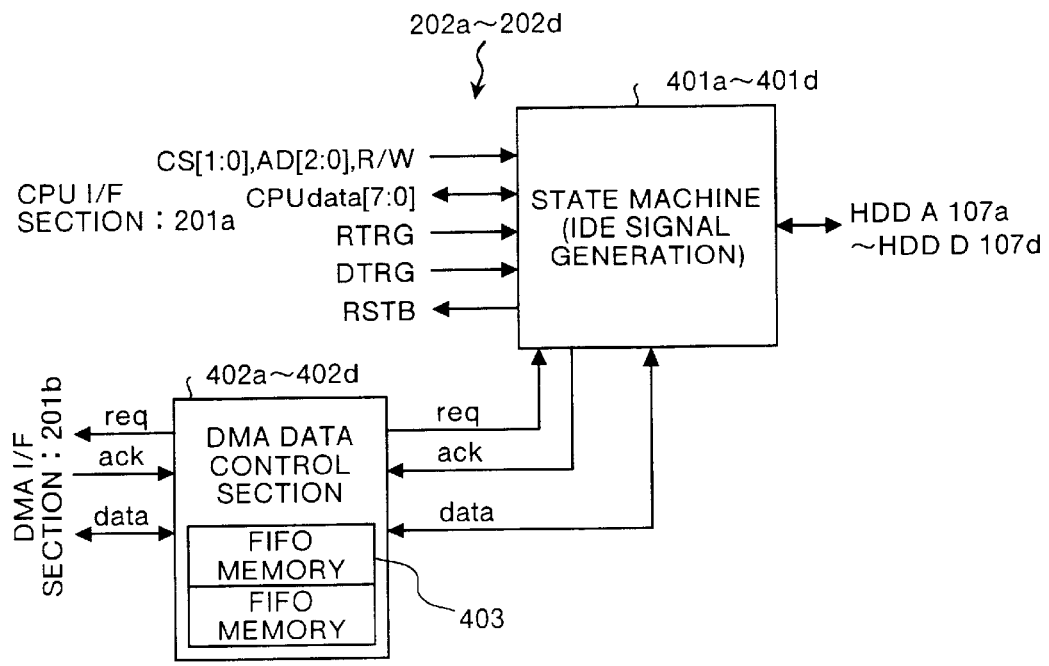
FIG. 5 is a diagram, which illustrates input/output of signals into/from the HDD interface (I/F) shown in FIG. 3.

FIG. 5 is a diagram illustrating input/output of signals into/from the HDD I/F A 202a to HDD I/F D 202d shown in FIG. 3. After the CPU 101 executes setting of the register 201c, the CPU I/F section 201a decodes the set address values in the register 201c, and issues signals and the set values (CPUdata) to each of the state machines 401a to 401d in the HDD I/F A 202a to HDD I/F D 202d. These signals include a chip select signal CS [1:0] and an address signal AD [2:0] which are IDE (Integrated Drive Electronics) I/F signals, a signal that sets reading/writing from/into the HDD's, and a trigger signal RTRG for starting data transfer.

Figure 6:
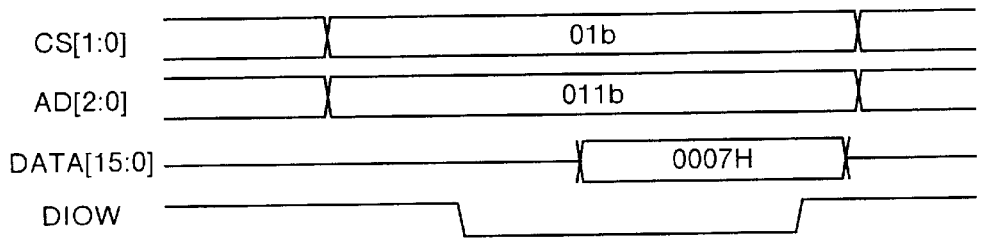
FIG. 6 is a diagram, which illustrates generation of signals when a state machine writes into an HDD.

FIG. 6 is a figure illustrating generation of signals when the state machines 401a to 401d write into the HDD A 107a to HDD D 107d. When the CPU 101 writes a value "07H" into the SECCOUNTW register in the address 6008 of the register 201c for example, the CPU I/F section 201a outputs the same IDE signals to all the HDD A 107a to HDD D 107d at the same time. Correspondingly, as shown in FIG. 6, the state machines 401a to 401d each assigns signals, where CS [1:0]=01b, and AD [2:0]=011b, to each of the corresponding HDD A 107a to HDD D 107d, asserts a signal DIOW, and writes the value "07H" into the respective sector count register of the HDD.

After writing into the HDD A 107a to HDD D 107d is completed, the state machines 401a to 401d issue return strobe signals RSTB's to the CPU I/F section 201a. When the signals RSTB's have been issued from all the HDD I/F A 202a to HDD I/F D 202d, the CPU I/F section 201a permits the CPU 101 to set the register as described below.

Figure 7:
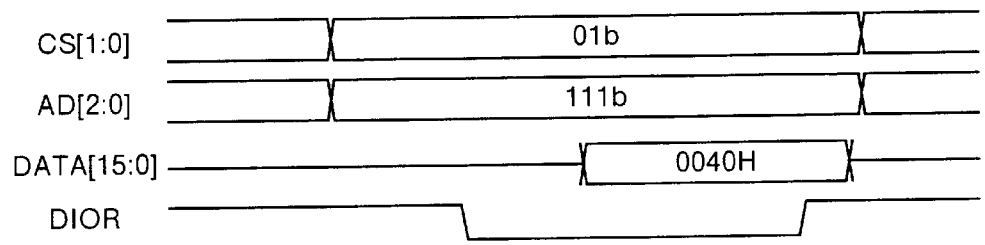
FIG. 7 is a diagram, which shows an example of the generation of signals when a state machine writes into an HDD.

FIG. 7 shows a diagram illustrating generation of signals to execute reading of statuses from the HDD A 107a to HDD D 107d by the state machines 401a to 401d. When the state machines 401a to 401d read out the set address values from the registers STATUS_A to D in the address 6050 of the register 201c, the state machines 401a to 401d each assigns signals CS [1:0]=01b and AD [2:0]=111b to the respective one of the HDD A 107a to HDD D 107d, and asserts a signal DIOR to read the statuses of the HDD's. In this example too, the CPU I/F section 201a issues signals to all the HDD I/F A 202a to HDD I/F D 202d at the same time, to output the same IDE signals to all the HDD's at the same time.

After reading of the HDD A 107a to HDD D 107d is completed, the state machines 401a to 401d each issues an RSTB (return strobe) signal to the CPU I/F section 201a. When the RSTB signals from all the HDD I/F A 202a to HDD I/F D 202d have been issued the CPU I/F section 201a notifies the CPU 101 that the status data read out are valid.

Figure 8:
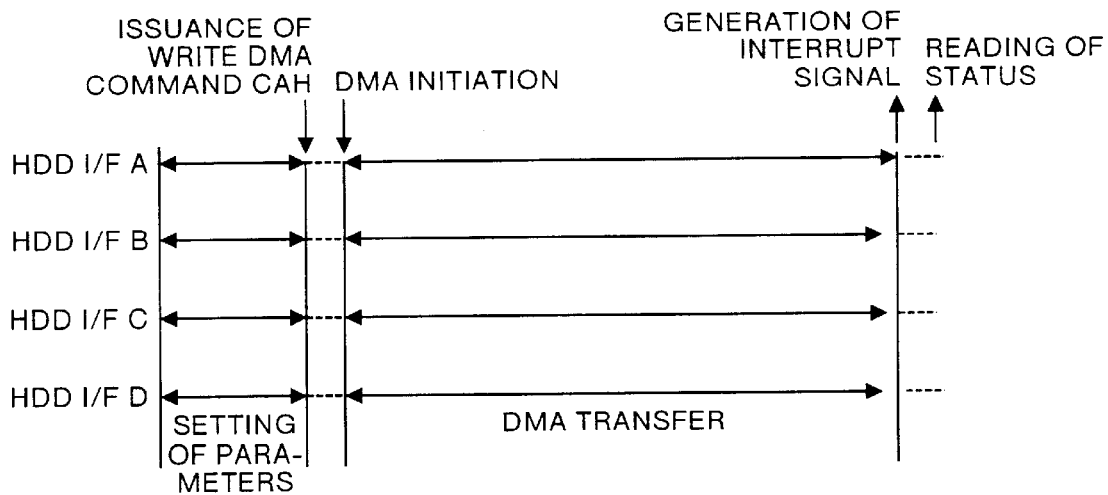
FIG. 8 is a diagram, which shows an operation of the HDD I/F.

DMA transfer of image data from the memory 101 to the HDD A 107a to HDD D 107d will now be described in detail. FIG. 8 is a diagram illustrating operations of the HDD I/F A 202a to HDD I/F D 202d. When the CPU 101 writes parameters required for the DMA transfer, into the register 201c in the CPU I/F section 201a of the HDD array control IC 106, the HDD I/F A 202a to HDD I/F D 202d each sets parameters into the HDD A 107a to HDD D 107d, the parameters required for the DMA transfer, such as an address in the storage area of the HDD and number of sectors to be transferred.

After setting the parameters into the register 201c, the CPU 101 writes in a DMA write command CAH into the COMMAND register in the address 6048, the register for issuing a command. The HDD I/F A 202a to HDD I/F D 202d then issue the command CAH to all the HDD A 107a to HDD D 107d at the same time. When the command CAH is issued, the HDD's go into a wait state for data transfer. The CPU 101 sets a bit RW of a data transfer register in the register HDCON that is in the address 6000 of the register 201c, into a value "1", to specify the direction of transfer such that the DMA transfer from the memory 105 to the HDD's is carried out.

When the CPU 101 sets the most significant bit MSB, which is a data transfer initiation bit DEXE, in the register HDCON of the register 201c, the CPU I/F section 201 issues a trigger signal (DTRG signal) to start DMA transfer to each of the state machines 401a to 401d which are in the HDD I/F A 202a to HDD I/F D 202d. The state machines 401a to 401d each generates an HDD interface signal at a timing appropriate for DMA transfer. The image data read out by the DMA control IC 104 from the memory 105 is transferred via the DMA I/F section 201b to be stored in the FIFO memories 403 of the DMA data control sections 402a to 402d, before the state machines 401a to 401d write the data into the HDD 107a to 107d.

When a set number of sectors have been DMA transferred, the HDD A 107a to HDD D 107d issue an interrupt to notify that the data transfer has ended. To issue this interrupt, each of the HDD A 107a to HDD D 107d outputs an interrupt signal to the CPU I/F section 201a (not shown). The CPU I/F section 201a waits until it receives the interrupt signals from all the HDD's before it generates an interrupt to the CPU 101, since each of the HDD's is operated by an independent interface and has a different data transfer rate.

When the CPU 101 receives the interrupt, it reads the status registers in the address 6050 of the register 201c to check statuses of the HDD's after the DMA transfer.

Figure 9:
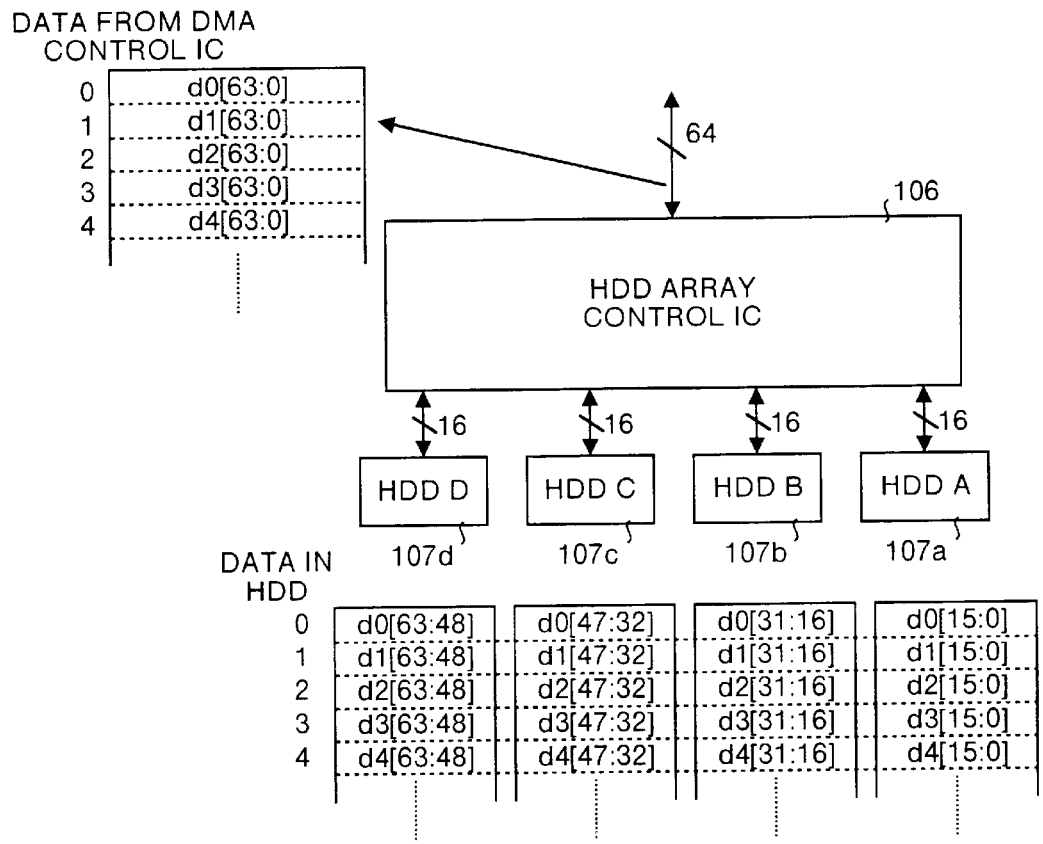
FIG. 9 is a diagram, which shows a method of storing image data into the HDD's.

A method of storing image data into the HDD A 107a to HDD D 107d will now be explained in detail while referring to FIG. 9. In FIG. 9, a letter d indicates data representing a pixel of the image data. The size of the data representing one pixel here is 64 bits (one pixel equivalent to 64 bits) In the HDD array control IC 106, the DMA I/F section 201b divides the data representing a pixel, which are transferred from the DMA control IC 104, into 16 bits. The DMA I/F section 201b then stores the divided image data into the HDD A 107a to HDD D 107d approximately at the same time assigning them as shown in FIG. 9, by transferring them through the HDD I/F A 202a to HDD I/F D 202d.

As already explained, the HDD I/F A 202a to HDD I/F D 202d each comprises a pair of toggle FIFO memories 403 in the respective one of the DMA data control sections 402a to 402d such that differences in transfer rates between the HDD A 107a to HDD D 107d can be compensated. Transfer of image data using these pairs of FIFO memories 403 will be explained in detail while referring to FIGS. 10 to 12.

As shown in FIGS. 10 and 11, when there is space in the corresponding FIFO memories 403, the HDD I/F A 202a to HDD I/F D 202d (DMA data control sections 402a to 402d) each asserts an REQ signal to permit transfer of image data.

The CPU-DMA I/F section 201 transfers the image data to the HDD A 107a to HDD D 107d when all the HDD I/F A 202a to HDD I/F D 202d assert the REQ signal such that the image data are sent to the HDD's at the same time. As shown in FIGS. 10 and 11, after the CPU-DMA I/F section 201 writes image data into the FIFO memories 403 until the pair of FIFO memories 403 become full, the corresponding one of HDD I/F A 202a to HDD I/F D 202d starts transferring the image data to the corresponding HDD A 107a to HDD D 107d.

Figure 12:
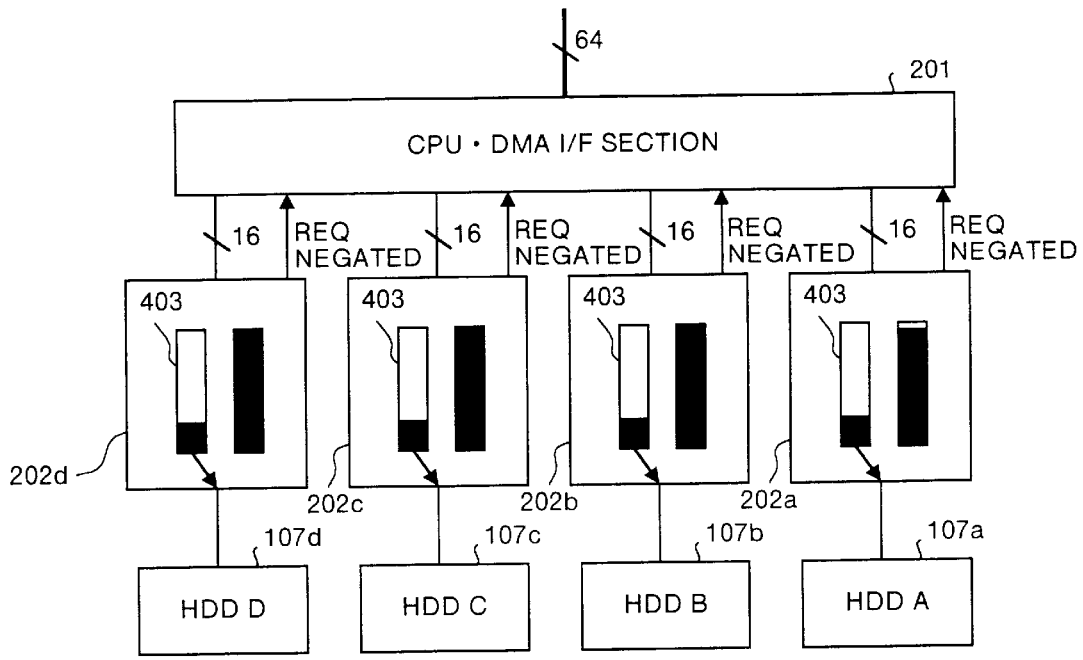
FIG. 12 is a diagram, which illustrates yet another example of transfer of image data using FIFO memories.

As shown in FIG. 11, reception of image data from the CPU-DMA I/F section 201 and transfer of image data to the HDD A 107a to HDD D 107d can be executed at the same time since the HDD's each has the pair of toggle FIFO memories 403. As shown in FIG. 12, when one of the paired toggle memories 403 is full in each HDD I/F and the other one of the toggle memories 403 is transferring image data to the HDD A 107a to HDD D 107d from each HDD I/F, image data cannot be transferred to the FIFO memories 403. The corresponding one of the HDD I/F A 202a to HDD I/F D 202d (DMA data control sections 402a to 402d) thus negates the REQ signal such that the CPU-DMA I/F section no longer transfers image data to the corresponding FIFO memories 403.

As explained above, according to the embodiment, the HDD array control IC (hard disk controller) 106 sets parameters or issues commands to all the HDD A 107a to HDD D 107d at the same time, via the register 201c that can be read/written by the CPU 101. Further, for DMA transfer of image data, the HDD array control IC 106 divides and sends the image data to each of the HDD A 107a to HDD D 107d the HDD's at the same time among the HDD's. As a result, it is possible to control a plurality of HDD's just as simply as it is to control a single HDD, and to transfer image data fast by operating the plurality of HDD's in parallel.

An image formation apparatus according to a second embodiment will now be explained while referring to FIGS. 13 and 14. The image formation apparatus according to the second embodiment is similar to that according to the first embodiment in its configuration and the way it operates and further detects any failures that occur in the HDD A 107a to HDD D 107d.

A method of detecting failures in the HDD A 107a to HDD D 107d will be explained while referring to FIGS. 13 and 14. FIG. 13 shows a state in which one of the HDD's, HDD B 107b, has failed.

When an HDD out of a plurality of HDD's fails, transfer of image data is interrupted midway through and the REQ signal then will not be asserted. Since the CPU-DMA I/F section 201 transfers image data only when all the REQ signals are asserted, transfer of image data between the DMA control IC 104 and the HDD array control IC 106 will be terminated if one of the REQ signals is not asserted.

As a result, a time-out error is caused since the CPU 101 does not receive from the HDD array control IC 106 (CPU I/F section 201a), an interrupt to terminate the transfer of image data. Although it is obvious that there is a failure in one of the HDD A 107a to HDD D 107d, since all the HDD A 107a to HDD D 107d remain in a state in which the data transfer command has not been executed completely, it is not possible to read the statuses of the HDD's and determine which one has failed. Therefore, it is also impossible to determine which HDD is to be replaced. The second embodiment thus relates to a method of identifying any failed HDD's.

Figure 13:
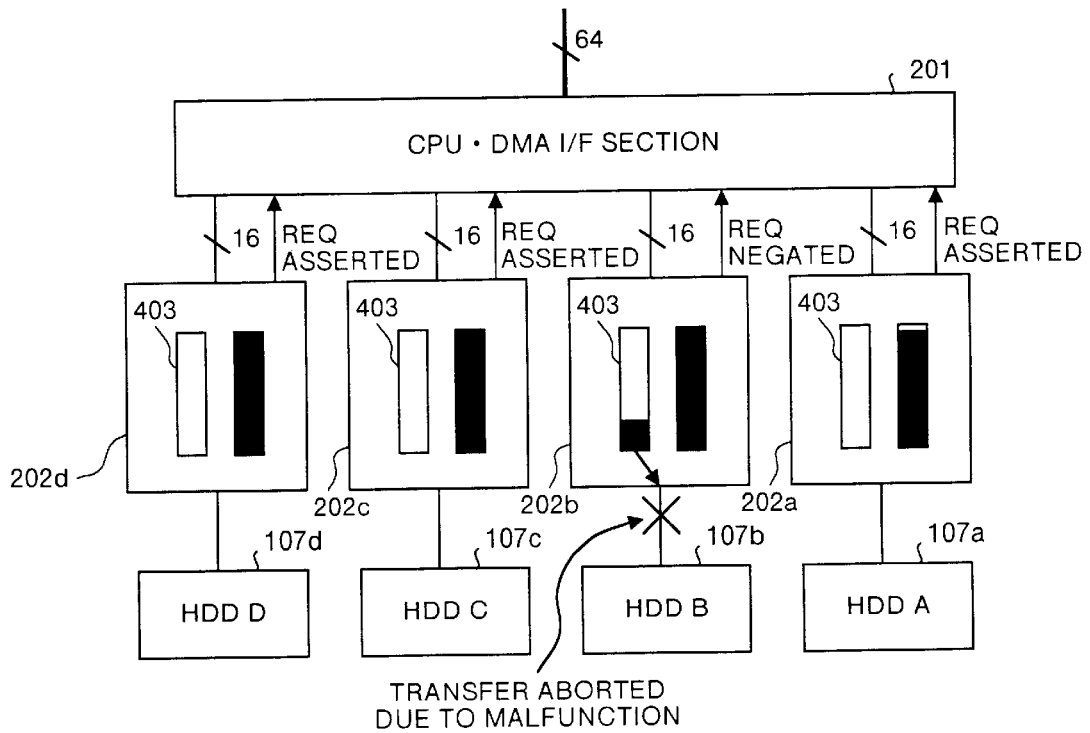
FIG. 13 is a diagram, which shows a state in which one of the HDD's has failed.

As shown in FIG. 13, even if one of the HDD's fails and transfer of image data to that HDD is interrupted, since the other HDD's each operates independently from the failed HDD, the DMA data control sections 402a to 402d corresponding to the other HDD's each reads out all the image data from their FIFO memories 403 and then asserts the REQ signal to the CPU-DMA I/F section 201. That is, the DMA data control sections 402a to 402d assert the REQ signals when the FIFO memories 403 are able to receive data. The CPU I/F section 201a then detects the assertion of the REQ signals, and writes in whether the REQ signals from the DMA data control sections 402a to 402d are asserted or negated, into the HDCON register of the register 201c.

Figure 14:
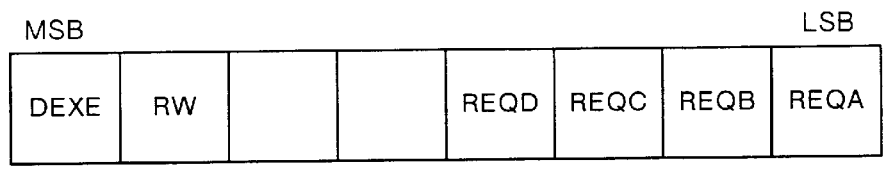
FIG. 14 is a diagram, which shows an example of a format of a register HDCON.

FIG. 14 shows an example of a format of the HDCON register. Registers REQA to REQD each corresponds to the respective one of the HDD I/F A 202a to HDD I/F D 202d. When the REQ signal is asserted, the value in each of the registers REQA to REQD is set to "1", and if nagated, it is set to "0". The registers REQA to REQD of the HDCON register can be monitored by the CPU 101.

When a time-out error of data transfer is caused due to a failure in one of the HDD A 107a to HDD D 107d, the CPU 101 reads the HDCON register to determine the HDD negating the REQ signal, as the failed HDD.

According to the second embodiment, the CPU I/F section 201a detects the REQ signal, which is asserted by each of the DMA data control sections 402a to 402d when the corresponding FIFO memories 403 are able to receive data. The CPU I/F section 201a then writes in the bit value, indicating the HDD that is not able to receive data, into the HDCON register. The CPU 101 reads the HDCON register to determine the failed HDD. Therefore, when one of the HDD's has a failure causing a time-out error, the HDD with the failure can be easily recognized.

An image formation apparatus according to a third embodiment will now be explained while referring to FIGS. 15 to 18. The image formation apparatus according to the third embodiment is similar to that according to the first embodiment in its configuration and the way it operates, and further detects a decrease in transfer rates of the HDD A 107a to HDD D 107d.

The overall transfer rate of all HDD's is sometimes decreased when the transfer rate of one of the HDD's is decreased due to some malfunction even if no time-out error is detected by the CPU 101. When this happens, it is unlikely that the CPU 101 is able to easily determine the HDD with the malfunction. In the third embodiment, a method of identifying the HDD in which the transfer rate is decreased due to some malfunction will thus be explained while referring to FIGS. 15 to 18.

Figure 15:
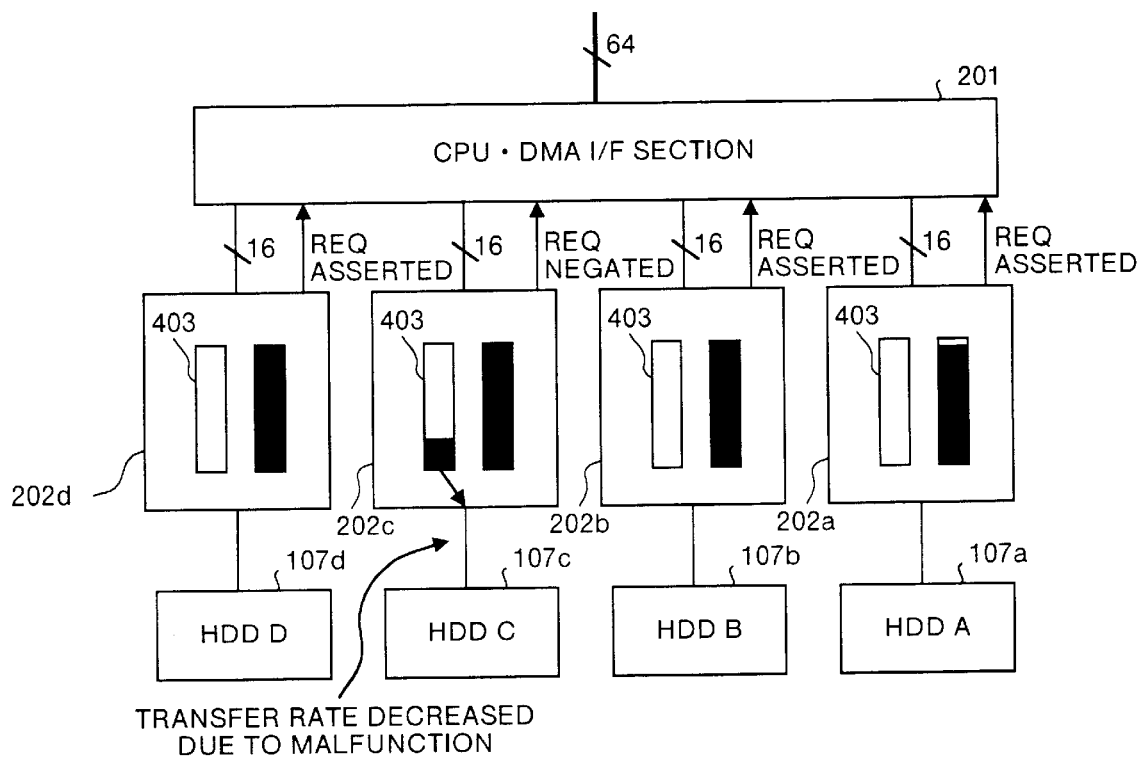
FIG. 15 is a diagram, which shows a state in which the transfer rate of one of the HDD's has decreased.

FIG. 15 shows a state in which the transfer rate of an HDD is decreased. When the transfer rate of the HDD C 107c is decreased due to some malfunction, an assertion timing of the REQ signal from the DMA data transfer control section 402c in the HDD I/F C 202c corresponding to the HDD C 107c, will be belated. The CPU I/F section 201a in the CPU-DMA I/F section 201 compares assertion timings of the REQ signals from the HDD I/F A 202a to HDD I/F D 202d to detect the HDD in which the transfer rate is decreased.

Figure 16:
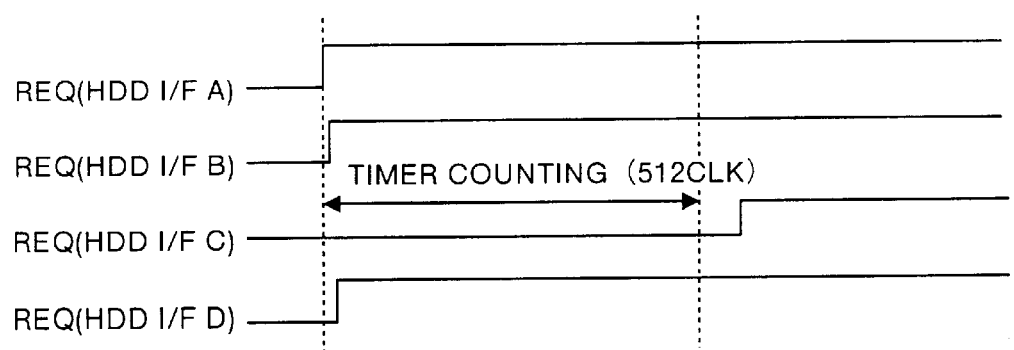
FIG. 16 is a diagram, which shows an example of a counting operation of a CPU I/F section in a central processing unit-direct memory access interface (CPU-DMA I/F) section.

FIG. 16 shows a counting operation of the CPU I/F section 201a in the CPU-DMA I/F section 201. The CPU I/F section 201a in the CPU-DMA I/F section 201 initiates a counter, when a first assertion of one of the REQ signals (the assertion of the REQ signal from the DMA data control section 402a in the example shown in FIG. 16) generated by the DMA data control sections 402a to 402d in the HDD I/F A 202a to HDD I/F D 202d, is executed, the assertion carried out when data transfer into another one of the FIFO memories 403 in the pair is started. After a number of clocks CLK's (512 CLK's in FIG. 16) set in a register not shown is counted, the REQ signals from the DMA data control sections 402a to 402d are sampled.

Figure 17:
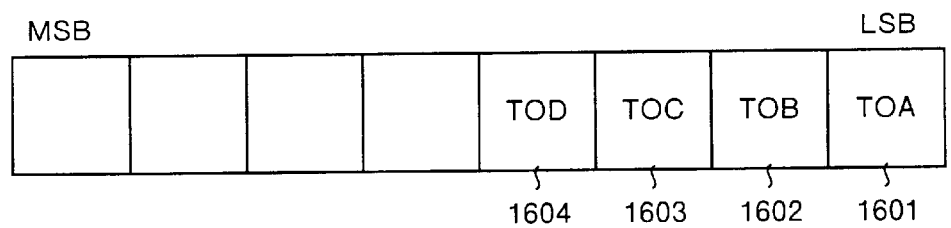
FIG. 17 is a diagram, which shows an example of a format of a time-out register.

If the CPU I/F section 201a detects negation of the REQ signal (that is, the REQ signal from the HDD I/F C 202c in FIG. 16), the CPU I/F section 201a writes which one of the HDD's was detected to have the REQ signal negated, into the time-out register. FIG. 17 shows an example of a format of the time-out register. Bits TOA 1601, TOB 1602, TOC 1603, and TOD 1604 correspond to the respective one of the HDD A 107a to HDD D 107d (the DMA data control sections 402a to 402d). The CPU I/F section 201a clears the bits, TOA 1601, TOB 1602, TOC 1603, TOD 1604 to a value "0" when starting transfer of image data to the FIFO memories, and sets the bit corresponding to one of the HDD A 107a to HDD D 107d (the DMA data control sections 402a to 402d) from which the negation was detected, to a value "1". According to the example shown in FIG. 16, the bit TOC 1603 is set to "1". The CPU I/F section 201a leaves the bit as set without executing any more detection of the signals shown in FIG. 16, until the next transfer is initiated.

After the image data transfer is completed, the CPU 101 monitors the bits TOA 1601, TOB 1602, TOC 1603, and TOD 1604 in the time-out register, to detect the HDD in which the transfer rate is decreased due to some malfunction. In the example shown in FIG. 15, the HDD C 107c is detected as the HDD with the transfer rate decreased.

As explained above, the CPU I/F section 201a detects the differences between the times at which the REQ signals from the HDD's (the DMA data control sections 402a to 402d) are asserted (when data transfer is possible) in accordance with states of data accumulated in the FIFO memories (buffer) 403 inside. If a time difference equal to or more than a threshold is detected, the bit corresponding to one of the DMA data control sections 402a to 402d that is the latest to assert the REQ signal, is set to "1" in the time-out register. Accordingly, since the states of the FIFO memories 403 in the DMA data control sections 402a to 402d are monitored, the HDD in which some malfunction has occurred can be specified out of the plurality of HDD's connected to the DMA data control sections.

The result of the detection is held in the time-out register when the counter once counts up to a number that exceeds a predetermined value from the time the first assertion of the REQ signal is executed. As a result, there may be a situation as shown in the example of FIG. 15 due to an emergent disturbance such as vibrations, the situation in which the result may be held in the time-out register. Therefore, an HDD that is actually working properly could be determined as the HDD with some malfunction due to an emergent disturbance such as vibrations.

Figure 18:
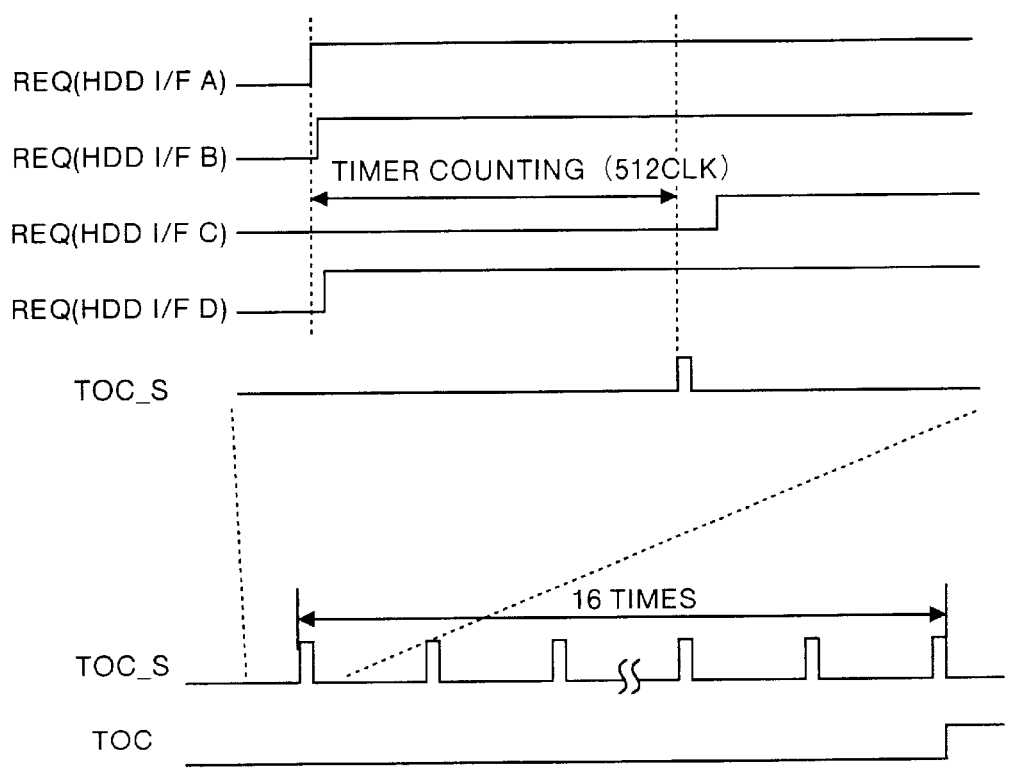
FIG. 18 is a diagram, which shows another example of the counting operation of the CPU I/F section in the CPU-DMA I/F section.
Figure 19:
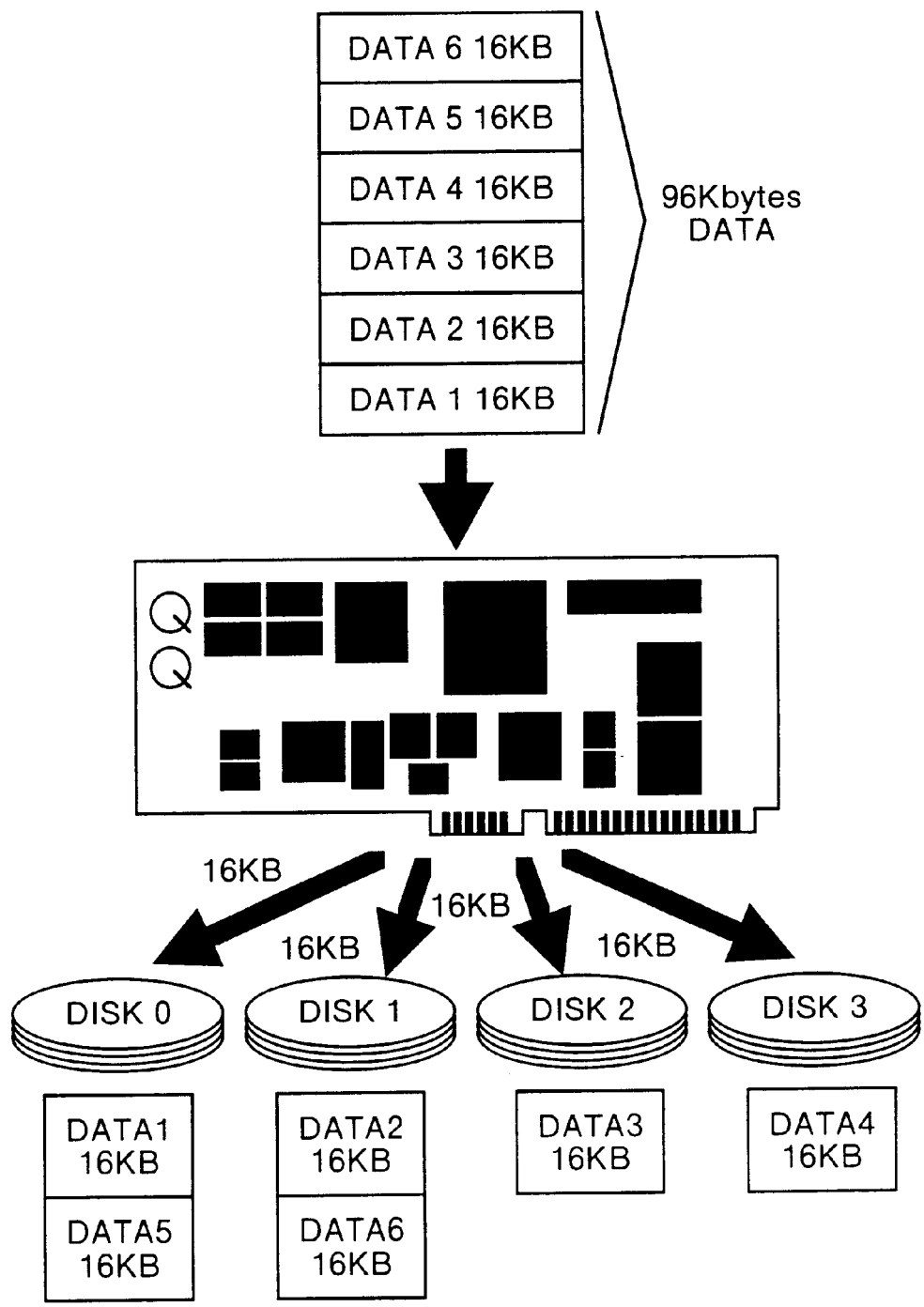
FIG. 19 is a diagram, which represents a conventional technology.

A method of identifying the HDD in which the transfer rate has decreased due to causes other than emergent disturbances such as vibrations, will now be explained. FIG. 18 is a diagram, which shows another example of the counting operation of the CPU I/F section 201*a* in the CPU-DMA I/F section 201.

The CPU I/F section 201*a* in the CPU-DMA I/F section 201 initiates the counter when the first assertion of one of the REQ signals is executed, the REQ signals generated by the HDD I/F A 202*a* to HDD I/F D 202*d* when data transfer into another one of the FIFO memories 403 in the corresponding pair is started. After the counter counts up to a number of clocks (512 CLK's in FIG. 18) set in the register not shown, the REQ signals from the HDD I/F A 202*a* to HDD I/F D 202*d* are sampled.

When the CPU I/F section 201*a* detects one of the REQ signals to be negated, the CPU I/F section 201*a* makes a pulse assertion (sets a bit) in a register TOX_S (X=A, B, C, or D) not shown. The TOA_S, TOB_S, TOC_S, and TOD_S each corresponds to the HDD A 107*a* (DMA data control section 402*a*), HDD B 107*b* (DMA data control section 402*b*), HDD C 107*c* (DMA data control section 402*c*), or HDD D 107*d* (DMA data control section 402*d*), respectively. In the example shown in FIG. 18, since the REQ signal from the HDD I/F C 202*c* (the DMA data control section 402*c*) is negated, a pulse assertion is executed (the bit is set) in the TOC_S.

When a number of pulse assertions (number of times the bit has been set) in the register TOX_S (X=A, B, C, or D) is equal to or greater than a number (16 in the example of FIG. 18) set in a register not shown, the CPU I/F section 201*a* sets the corresponding one of the bits TOA, TOB, TOC, and TOD in a time-out register shown in FIG. 17 to a value "1". The bits, TOA, TOB, TOC, and TOD in the time-out register are reset to "0" at the beginning of data transfer to the FIFO memories. In the example of FIG. 18, since 16 pulse assertions are made (the bit is set 16 times) in the register TOC_S, the bit TOC in the time-out register is set to a value "1".

The CPU 101 monitors the bits TOA 1601, TOB 1602, TOC 1603, and TOD 1604 in the time-out register after transfer of image data is completed. Accordingly, the HDD (DMA data control section), in which the transfer rate has decreased due to a cause other than an emergent disturbance such as vibrations, can be detected.

As already explained, the CPU I/F section 201*a* detects the time differences between the times at which the REQ signals are asserted when the FIFO memories 403 in the DMA data control sections 402*a* to 402*d* are able to receive data. If the time difference equal to or more than a threshold is detected, the bit corresponding to the DMA data control section in which the transfer rate is decreased is set in the register. The number of times the bit has been set is counted for each of the DMA data control sections 402*a* to 402*d*.

When the number counted is equal to or more than a threshold, the corresponding bit of the DMA data control section is set in the time-out register, such that the CPU 101 can read the time-out register to determine the DMA data control section in which the transfer rate has been decreased. As a result, the CPU 101 no longer determines that the HDD in which the transfer rate is temporarily decreased due to an emergent disturbance such as vibrations as the failed HDD. Therefore, it is possible to accurately specify the HDD in which the transfer rate has been decreased, out of the HDD's connected to the DMA data control sections.

As explained above, the image formation apparatus according to one aspect of the present invention comprises an input unit, which inputs image data, a central processing unit which controls an overall operation of the apparatus, a memory which stores one page of image data input by the input unit, a direct memory access controller which controls reading/writing of image data from/into the memory, a plurality of hard disk drives which store image data, a hard disk controller which sends/receives image data to/from the direct memory access controller and controls reading/writing of image data from/into the plurality of hard disk drives, and an image formation unit which forms images of image data. Further, the hard disk controller controls setting of parameters, issuance of commands, and reading of statuses for the plurality of hard disk drives approximately at the same time among the plurality of hard disk drives, and divides the image data to execute direct memory access transfer of the divided image data to the plurality of hard disk drives approximately at once. Accordingly, the hard disk controller is able to control setting of parameters, issuance of commands, and reading of statuses for the plurality of HDD's approximately at the same time among the plurality of HDD's. Moreover, the hard disk controller can execute DMA transfer of image data to the plurality of HDD's approximately at once. Therefore, it is possible to achieve fast image transfer to a plurality of HDD's with such a simple configuration, and to provide an image formation apparatus comprising a hard disk controller that is able to efficiently control a plurality of HDD's as a single HDD.

Moreover, the hard disk controller includes a central processing unit-direct memory access interface section which interfaces the central processing unit with the direct memory access controller, and a plurality of hard disk drive interfaces each of which independently reads/writes image data from/into the corresponding one of the plurality of hard disk drives. The central processing unit-direct memory access interface section has a central processing unit interface section and a direct memory access interface section. The central processing unit interface section has a register that can be read/written by the central processing unit, and decodes commands set into the register by the central processing unit and instructs the central processing unit to generate signals that instruct reading/writing into the plurality of hard disk drives and to initiate direct memory access. The direct memory access interface section divides image data and executes direct memory access transfer of the divided image data to the plurality of hard disk drive interfaces when the plurality of hard disk drive interfaces are all ready to receive data. The plurality of hard disk drive interfaces each has a buffer which stores image data inside, a direct memory access data control section, and a state machine. The direct memory access data control section transfers image data transferred from the direct memory access interface section to the state machine after storing the image data into the buffer. The state machine generates access signals for command writing and status reading into and from the hard disk drive when the central processing unit interface section instructs the state machine to read/write. The state machine generates an interface signal of direct memory access for the hard disk drive and executes direct memory access transfer of image data, when the state machine is instructed by the central processing unit interface section to initiate direct memory access. Accordingly, the CPU writes a command into the register in the CPU I/F section of the hard disk controller such that the CPU I/F section can make an instruction to generate signals that instruct reading/writing into the plurality of hard disk drives and to initiate direct memory access. Furthermore, the plurality of HDD I/F's can read/write image data from/into the plurality of HDD's independently from each other. As a result, an image formation apparatus can be provided, which comprises a hard disk controller that is able to control a plurality of hard disk drives even more efficiently as a single hard disk drive with a simple configuration.

Furthermore, the register comprises write registers which are to be written by the central processing unit and each common to the plurality of hard disk drives, and read registers which are to be read by the central processing unit and provided one each for each of the plurality of hard disk drives. The central processing unit writes in one value into the corresponding one of the write registers when a command is to be issued to or a parameter is to be written into the plurality of hard disk drives, and the central processing unit interface section accordingly issues what has been written into the write register to the plurality of hard disk drives approximately at the same time. The central processing unit interface section writes in values readout from the plurality of hard disk drives approximately at the same time, into the read registers, the values representing statuses and parameters of the plurality of hard disk drives. Accordingly, the CPU writes one value into the register, the value representing a command or a parameter for the HDD's such that the command or the parameter can be issued to the plurality of HDD's at the same time. Moreover, the CPU is able to read different values at once, the values representing statuses or parameters of the plurality of HDD's. As a result, it is possible to provide an image formation apparatus comprising a hard disk controller which enables issuance of commands and parameters and reading of status and parameters to and from a plurality of HDD'S efficiently.

Moreover, the central processing unit interface section issues an interrupt to the central processing unit after receiving all interrupt signals asserted by the plurality of hard disk drives when direct memory access transfer of image data to the plurality of hard disk drives is completed. Accordingly, the CPU I/F section issues an interrupt to the CPU after direct memory access transfer of image data to the plurality of HDD's is completed. As a result, an image formation apparatus comprising a hard disk controller that can prevent errors in image data transfer can be provided.

Furthermore, the central processing unit interface section includes a detection unit which detects the REQ signals each asserted when the buffer in each of the direct memory access data control sections is able to receive data and an identification unit which sets a bit in the register, the bit indicating the hard disk drive not able to receive data, according to the result of detection by the detection unit, and the central processing unit reads the register to determine the hard disk drive that has failed. Accordingly, the HDD with a malfunction can be specified, by monitoring whether the buffers in the DMA data control sections inside the hard disk controller are able to receive data. As a result, an image formation apparatus comprising a hard disk controller that is able to specify the HDD with a malfunction, out of a plurality of HDD's, can be provided.

Moreover, the central processing unit interface section includes a time difference detection unit which detects time differences between times at which the REQ signals are asserted by the direct memory access data control sections when the buffer in each of the direct memory access data control sections is able to receive data and an identification unit which sets a bit in the register, the bit indicating the direct memory access data control section which asserts the REQ signal most belatedly when one of the time differences detected by the time difference detection unit is equal to or greater than a threshold, and the central processing unit reads the register to determine the direct memory access data control section in which the transfer rate has been decreased. Accordingly, the time differences between times at which the REQ signals are asserted each according to the amount of data stored in the buffer inside each of the plurality of DMA data control sections, are detected, and the HDD connected to the DMA data control section found to have the time difference equal to or greater than a threshold can be specified as the HDD in which the transfer rate has been decreased. As a result, it is possible to provide an image formation apparatus comprising a hard disk controller that is able to specify the HDD with a decreased transfer rate, out of a plurality of HDD's.

Furthermore, the central processing unit interface section includes a time difference detection unit which detects time differences between times at which the REQ signals are asserted by the direct memory access data control sections when the buffer in each of the direct memory access data control sections is able to receive data, a first identification unit which sets a bit into the register, the bit indicating the direct memory access data control section in which the transfer rate has been decreased when one of the time differences detected by the time difference detection unit is equal to or greater than a threshold, a counting unit which counts up a number of times the bit has been set into the register by the first identification unit, for each of the direct memory access data control sections, and a second identification unit which sets a bit in the register. The bit corresponds to the direct memory access data control section of which the number counted by the counting unit is equal to or greater than a threshold, and the central processing unit reads the register to identify the direct memory access data control section in which the transfer rate has been decreased. Accordingly, the time differences between times at which the REQ signals are asserted each according to the amount of data stored in the buffer inside each of the plurality of DMA data control sections, are detected, and the number of times each of the DMA data control sections is found to have the time difference equal to or greater than a threshold is counted. If the count for one of the DMA data control sections reached a number that is equal to or greater than a threshold, the HDD connected to the DMA data control section can be specified as the HDD in which the transfer rate has been decreased due to a cause other than an emergent disturbance such as vibrations. As a result, it is possible to provide an image formation apparatus comprising a hard disk controller that is able to specify the HDD with a decreased transfer rate out of a plurality of HDD's, the decrease caused by reasons other than emergent disturbances such as vibrations.

Moreover, the plurality of hard disk drives are in conformity with the ATA standard. As a result, an image formation apparatus, which can be used in a system that is in conformity with the ATA standard, can be provided.

Furthermore, the hard disk controller divides pixel data of image data by a predetermined number of bits and executes direct memory transfer of the divided image data to the plurality of hard disk drives. As a result, an image formation apparatus can be provided, in which image data can be divided easily, and the divided image data can be DMA transferred to a plurality of HDD's approximately at the same time among the plurality of HDD's.

The image formation method according to another aspect of the present invention comprises an input step of inputting image data, a memory storage step in which a direct memory access controller writes the input image data into a memory, a transfer step in which the direct memory access controller reads the image data from the memory and transmits the image data to a hard disk controller, and a hard disk drive storage step in which the hard disk controller writes the image data transferred from the direct memory access controller, into a plurality of hard disk drives. In the hard disk drive storage step, the hard disk controller controls setting of parameters and issuance of commands for the plurality of hard disk drives approximately at the same time among the plurality of hard disk drives, and divides the image data to execute direct memory access transfer of the divided image data to the plurality of hard disk drives approximately at once. Accordingly, the hard disk controller is able to control setting of parameters, issuance of commands, and reading of statuses for the plurality of HDD's approximately at the same time among the plurality of HDD's. Moreover, the hard disk controller can execute DMA transfer of image data to the plurality of HDD's in parallel. Therefore, it is possible to achieve fast image transfer to a plurality of HDD's with a simple configuration, and to provide an image formation method through which a plurality of HDD's can be efficiently controlled as a single HDD.

Moreover, the hard disk controller includes a central processing unit-direct memory access interface section which interfaces a central processing unit with the direct memory access controller, and a plurality of hard disk drive interfaces each of which independently reads/writes image data from/into the corresponding one of the plurality of hard disk drives. The central processing unit-direct memory access interface section has a central processing unit interface section with a register inside, and a direct memory access interface section. The hard disk drive storage step includes a step of instructing initiation of direct memory access, the step in which the central processing unit interface decodes a command for direct memory access transfer, the command set in the register by the central processing unit, a step in which the direct memory access interface section divides image data and transfers the divided image data to the plurality of hard disk drive interfaces when all of the plurality of hard disk drive interfaces are ready to receive data, a step in which the direct memory access data control section in each of the plurality of hard disk drive interfaces sends the image data transferred from the direct memory access interface section to a state machine in each of the plurality of hard disk drive interfaces after storing the image data into a buffer and a step in which the state machine generates a direct memory access interface signal for the plurality of hard disk drives to execute direct memory access transfer of the image data, when the state machine receives an instruction from the central processing unit interface section to initiate direct memory access. Accordingly, the CPU writes a command into the register in the CPU I/F section of the hard disk controller such that the CPU I/F section can make an instruction to generate signals that instruct reading/writing into the plurality of hard disk drives and to initiate direct memory access. Furthermore, the plurality of HDD I/F's can read/write image data from/into the plurality of HDD's independently from each other. As a result, an image formation method can be provided, through which a plurality of hard disk drives can be controlled as a single hard disk drive even more efficiently with a simple configuration.

Furthermore, the register comprises write registers which are to be written by the central processing unit and each common to the plurality of hard disk drives, and read registers which are to be read by the central processing unit and provided one each for each of the plurality of hard disk drives. The central processing unit writes in one value in the corresponding one of the write registers when a command is to be issued to or a parameter is to be written into each of the plurality of hard disk drives, and the central processing unit interface section accordingly issues what has been written into the write register to the plurality of hard disk drives approximately at the same time among the hard disk drives. The central processing unit interface section writes in values read out from the plurality of hard disk drives approximately at the same time into the read registers, the values indicating statuses and parameters of the plurality of hard disk drives. Accordingly, the CPU writes one value into the register, the value representing a command or a parameter for the HDD's such that the command or the parameter can be issued to the plurality of HDD's at the same time. Moreover, the CPU is able to read different values at once, the values representing statuses or parameters of the plurality of HDD's. As a result, it is possible to provide an image formation method through which issuance of commands and parameters and reading of statuses and parameters to and from a plurality of HDD'S can be achieved efficiently.

Moreover, the central processing unit interface section issues an interrupt to the central processing unit after receiving all interrupt signals asserted by the plurality of hard disk drives when direct memory access transfer of image data to the hard disk drives is completed. Accordingly, an interrupt is issued by the CPU I/F section when direct memory access transfer of image data to the plurality of HDD's is completed. As a result, it is possible to provide an image formation method through which errors in image data transfer can be prevented.

Furthermore, the image formation method further comprises a failure determination process of detecting the hard disk drive that has failed. The process includes a detection step in which the central processing unit interface section detects the REQ signals each asserted when the buffer in each of the direct memory access data control sections is ready to receive data and an identification step in which the central processing unit interface section writes a bit into the register according to the result of the detection step, the bit indicating the hard disk drive not able to receive data and a determination step in which the central processing unit reads the register to determine the failed hard disk drive. Accordingly, the HDD with a malfunction can be specified, by monitoring whether the buffers in the DMA data control sections inside the hard disk controllers are able to receive data. As a result, it is possible to provide an image formation method through which the HDD with a malfunction can be specified out of a plurality of HDD's.

Moreover, the image formation method further comprises a determination process of detecting the direct memory access data control section in which the transfer rate has decreased. The process includes a time difference detection step in which the central processing unit interface section detects time differences between times at which the REQ signals are asserted in the direct memory access data control sections when the buffer in each of the direct memory access data control sections is able to receive data, an identification step in which the central processing unit interface section sets a bit in the register, the bit indicating the direct memory access data control section which asserts the REQ signal most belatedly, when one of the time differences detected in the time difference detection step is equal to or greater than a threshold, and a determination step in which the central processing unit reads the register to determine the direct memory access data control section in which the transfer rate has been decreased. Accordingly, the time differences between times at which the REQ signals are asserted each according to the amount of data stored in the buffer inside each of the plurality of DMA data control sections are detected and the HDD connected to the DMA data control section found to have the time difference equal to or greater than a threshold can be specified as the HDD in which the transfer rate has been decreased. As a result, it is possible to provide an image formation method through which the HDD with a decreased transfer rate can be specified out of a plurality of HDD's.

Furthermore, the image formation method further comprises a determination process of detecting the direct memory access data control section in which the transfer rate has decreased. The process includes a time difference detection step in which the central processing unit interface section detects time differences between times at which the REQ signals are asserted in the direct memory access data control sections when the buffer in each of the direct memory access data control sections is able to receive data, a first identification step in which the central processing unit interface section sets a bit into the register, the bit indicating the direct memory access data control section in which the transfer rate has been decreased, when one of the time differences detected in the time difference detection step is equal to or greater than a threshold, a counting step in which the central processing unit interface section counts up a number of times the bit has been set in the register in the first identification step, for each of the direct memory access data control sections, and a second identification step in which the central processing unit interface section sets a bit in the register, this bit corresponding to the direct memory access data control section of which the number counted in the counting step is equal to or greater than a threshold. The central processing unit reads the register to identify the direct memory access data control section in which the transfer rate has been decreased. Accordingly, the time differences between times at which the REQ signals are asserted each according to the amount of data stored in the buffer inside each of the plurality of DMA data control sections, are detected, and the number of times each of the DMA data control sections is found to have the time difference equal to or greater than a threshold, is counted. If the count for one of the DMA data control sections reaches a number that is equal to or greater than a threshold, the HDD connected to the DMA data control section can be specified as the HDD in which the transfer rate has been decreased due to a cause other than emergent disturbances such as vibrations. As a result, it is possible to provide an image formation method through which the HDD with a decreased transfer rate can be specified out of a plurality of HDD's, the decrease caused by reasons other than emergent disturbances such as vibrations.

Moreover, the plurality of hard disk drives are in conformity with the ATA standard. As a result, it is possible to provide an image formation method which can be used in a system that is in conformity with the ATA standard.

Furthermore, the hard disk controller divides pixel data of image data by a predetermined number of bits and executes direct memory access transfer of the divided image data to the plurality of hard disk drives. As a result, an image formation method can be provided, in which image data can be divided easily, and the divided image data can be DMA transferred to a plurality of HDD's approximately at the same time among the plurality of HDD's.

The present document incorporates by reference the entire contents of Japanese priority documents, 2001-081630 filed in Japan on Mar. 21, 2001 and 2002-024413 filed in Japan on Jan. 31, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation apparatus comprising:
an input unit which acquires an image data;
a central processing unit which controls an overall operation of the apparatus;
a plurality of hard disk drives which store the image data;
a memory which stores at least one page of the image data;
a direct memory access controller which controls reading/writing of the image data from/into the memory;
a hard disk controller which sends/receives the image data to/from the direct memory access controller when reading/writing the image data from/into the memory and controls reading/writing of image data from/into the hard disk drives; and
an image formation unit which forms an image based on the image data,
wherein the hard disk controller controls setting of parameters, issuance of commands, and reading of statuses for said hard disk drives substantially at the same time, divides the image data into a plurality of pieces, and executes direct memory access transfer of the pieces of the image data to the hard disk drives substantially at the same time, and the hard disk controller includes a central processing unit-direct memory access interface unit which interfaces the central processing unit with the direct memory access controller;
wherein the hard disk controller further includes a plurality of hard disk drive interfaces each of which independently reads/writes image data from/into the corresponding one of said hard disk drives,
said central processing unit-direct memory access interface unit having,
a central processing unit interface unit, having a register that can be read/written by the central processing unit and in which the central processing unit sets commands, which decodes the commands set into the register and instructs the central processing unit to generate signals that instruct reading/writing into said hard disk drives and to initiate direct memory access; and
a direct memory access interface unit which perform the division of the image data and the execution of the direct memory access transfer of the pieces of the image data to said hard disk drive interfaces when all of said hard disk drive interfaces are able to receive data, and each of said hard disk drive interfaces having,
- a state machine which generates access signals for command writing and status reading into and from the hard disk drive when the state machine receives an instruction from the central processing unit interface unit to perform reading/writing, and generates an interface signal for performing a direct memory access to the hard disk drives and executes the direct memory access transfer of the image data when the state machine receives an instruction from the central processing unit interface unit to initiate the direct memory access; and
- a direct memory access data control unit, having a buffer which stores the image data, which transfers image data received from the direct memory access interface unit to the state machine after once storing the image data into the buffer.

2. The image formation apparatus according to claim 1, wherein the register comprises:
- a write register that is common to the hard disk drives and into which data are written by the central processing unit; and
- a read register for each of the hard disk drives and from which data are read by the central processing unit, wherein
- said central processing unit writes in one value into said write register when a command is to be issued to or a parameter is to be written into said hard disk drives, and the central processing unit interface unit issues the value written into the write register to said hard disk drives substantially at the same time, and
- said central processing unit interface unit writes in values, the values representing statuses and parameters of the hard disk drives, read out substantially at the same time from said hard disk drives, into the read registers.

3. The image formation apparatus according to claim 1, wherein the central processing unit interface unit issues an interrupt to the central processing unit after receiving all interrupt signals that are asserted by said hard disk drives when the direct memory access transfer of the pieces of the image data to said hard disk drives is completed.

4. The image formation apparatus according to claim 1, wherein the central processing unit interface unit includes,
- a detection unit which detects REQ signals each asserted when the buffer in each of the direct memory access data control units is able to receive the image data; and
- an identification unit which writes data that indicates that specific one or more of the hard disk drives is/are not able to receive the image data due to a failure into the register, when the detection unit does not detect the REQ signal, and
- wherein the central processing unit reads the data from the register and determines which of the hard disk drives have the failure.

5. The image formation apparatus according to claim 1, wherein said central processing unit interface unit includes,
- a time difference detection unit which detects time differences between times at which REQ signals are asserted by the direct memory access data control units when the buffer in each of the direct memory access data control units is able to receive the image data; and
- an identification unit which writes data into the register that indicates which specific one of said direct memory access data control units which asserts the REQ signal most belatedly when one of the time differences detected by the time difference detection unit is equal to or greater than a threshold, and
- wherein the central processing unit reads the data from the register and determines for which one of said direct memory access data control units a rate of transfer of the image data has decreased.

6. The image formation apparatus according to claim 1, wherein said central processing unit interface unit includes,
- a time difference detection unit which detects time differences between times at which REQ signals are asserted by the direct memory access data control units when the buffer in each of the direct memory access data control units is able to receive the image data;
- a first identification unit which writes data into the register that indicates that a specific one of said direct memory access data control unit in which the transfer rate has been decreased when one of the time differences detected by the time difference detection unit is equal to or greater than a threshold;
- a counting unit which counts up a number of times the data has been written into the register by the first identification unit, for each of the direct memory access data control units; and
- a second identification unit which writes data into the register that indicates which specific one of said direct memory access data control unit for which the number counted by the counting unit is equal to or greater than a threshold, and
- wherein the central processing unit reads the data from the register and determines for which one of the direct memory access data control units a rate of transfer of the image data has decreased.

7. An image formation method applied to an image formation apparatus comprising an input unit, a memory, a direct memory access controller, a central processing unit, a plurality of hard disk drives, and a hard disk controller, the method comprising:
- an input step in which the input unit acquires an image data;
- a memory storage step in which the direct memory access controller writes the image data into the memory;
- a transfer step in which the direct memory access controller reads the image data from the memory and transmits the image data to the hard disk controller; and
- a hard disk drive storage step in which the hard disk controller writes the image data, transferred from the direct memory access controller, into said hard disk drives;
- wherein in the hard disk drive storage step, the hard disk controller controls setting of parameters and issuance of commands for said hard disk drives substantially at the same time, divides the image data into a plurality of pieces, and executes the direct memory access transfer of the pieces of the image data to the hard disk drives substantially at the same time and the hard disk controller includes a central processing unit-direct memory access interface unit which interfaces the central processing unit with the direct memory access controller, wherein
- said hard disk controller further includes a plurality of hard disk drive interfaces, each of which independently reading/writing the image data from/into the corresponding one of said hard disk drives,
- said central processing unit-direct memory access interface unit has a central processing unit interface unit with a register inside, and a direct memory access interface unit, each of said hard disk drive interfaces has a direct memory access data control unit, a buffer and a state machine, and the hard disk drive storage step includes, a step of instructing initiation of direct memory access, the step in which the central processing unit interface unit decodes a command for direct memory access transfer, the command being set in the register by the central processing unit;

a step in which the direct memory access interface unit divides the image data and transfers the divided image data to said hard disk drive interfaces when all of said hard disk drive interfaces are able to receive data;

a step in which the direct memory access data control unit in each of said hard disk drive interfaces sends the image data transferred from the direct memory access interface unit to the state machine after storing the image data into the buffer; and a step in which the state machine in each of said hard disk drive interfaces generates a direct memory access interface signal for said hard disk drives to execute direct memory access transfer of the image data, when the state machine receives an instruction from the central processing unit interface unit to initiate direct memory access.

8. The image formation method according to claim 7, wherein the register comprises:

a write register that is common to the hard disk drives and into which data are written by the central processing unit; and a read register for each of the hard disk drives and from which data are read by the central processing unit, wherein said central processing unit writes in one value into the write register when a command is to be issued to or a parameter is to be written into the hard disk drives, and the central processing unit interface unit issues the value written into the write register to the hard disk drives substantially at the same time, and said central processing unit interface unit writes in values, the values representing statuses and parameters of the hard disk drives, read out substantially at the same time from the hard disk drives, into the read registers.

9. The image formation method according to claim 7, wherein the central processing unit interface unit issues an interrupt to the central processing unit after receiving all interrupt signals that are asserted by the hard disk drives when the direct memory access transfer of the pieces of the image data to the hard disk drives is completed.

10. The image formation method according to claim 7, further comprising a failure determination process of detecting the hard disk drive that has failed, the process including:

a detection step in which the central processing unit interface unit detects REQ signals each asserted when the buffer in each of the direct memory access data control units is able to receive the image data; and an identification step in which the central processing unit interface unit writes data into the register according to the result of the detection step, the data indicating the hard disk drive not able to receive the image data; and a determination step in which the central processing unit reads the data from the register to determine the hard disk drive that has failed.

11. The image formation method according to claim 7, further comprising a determination process of detecting the direct memory access data control unit in which a rate of transfer of the image data has decreased, the process including:

a time difference detection step in which the central processing unit interface unit detects time differences between times at which REQ signals are asserted by the direct memory access data control units when the buffer in each of the direct memory access data control units is able to receive the image data;

an identification step in which the central processing unit interface unit sets data in the register, the data indicating the direct memory access data control unit which asserts the REQ signal most belatedly, when one of the time differences detected in the time difference detection step is equal to or greater than a threshold; and a determination step in which the central processing unit reads the data from the register to determine the direct memory access data control units in which the rate of transfer of the image data has decreased.

12. The image formation method according to claim 7, further comprising a determination process of detecting the direct memory access data control unit in which a rate of transfer of the image data has decreased, the process including:

a time difference detection step in which the central processing unit interface unit detects time differences between times at which the REQ signals are asserted by the direct memory access data control units when the buffer in each of the direct memory access data control units is able to receive the image data;

a first identification step in which the central processing unit interface unit sets data into the register, the data indicating the direct memory access data control unit in which the rate of transfer of the image data has decreased, when one of the time differences detected in the time difference detection step is equal to or greater than a threshold;

a counting step in which the central processing unit interface unit counts up a number of times the data has been set in the register in the first identification step, for each of the direct memory access data control units; and a second identification step in which the central processing unit interface unit sets data in the register, the data corresponding to the direct memory access data control unit of which the number counted in the counting step is equal to or greater than a threshold, and a determination step in which the central processing unit reads the register to identify the direct memory access data control unit in which the rate of transfer of the image data has decreased.

13. An image formation apparatus comprising:

an input unit which acquires an image data;

a central processing unit which controls an overall operation of the apparatus;

a plurality of hard disk drives which store the image data;

a memory which stores at least one page of the image data;

a direct memory access controller which controls reading/writing of the image data from/into the memory;

a hard disk controller which sends/receives the image data to/from the direct memory access controller when reading/writing the image data from/into the memory and controls reading/writing of image data from/into the hard disk drives; and an image formation unit which forms an image based on the image data, wherein the hard disk controller controls setting of parameters, issuance of commands, and reading of statuses for said hard disk drives substantially at the same time, divides the image data into a plurality of pieces, and executes direct memory access transfer of the pieces of the image data to the hard disk drives substantially at the same time, and the hard disk controller includes a central processing unit-direct memory access interface unit which interfaces the central processing unit with the direct memory access controller, wherein said central processing unit-direct memory access interface unit has a central processing unit interface unit having a register that can be read/written by the central processing unit and in which the central processing unit sets commands, which decodes the commands set into the register and instructs the central processing unit to generate signals that instruct reading/writing into said hard disk drives and to initiate direct memory access.

14. An image formation apparatus comprising:

an input unit which acquires an image data;

a central processing unit which controls an overall operation of the apparatus;

a plurality of hard disk drives which store the image data;

a memory which stores at least one page of the image data;

a direct memory access controller which controls reading/writing of the image data from/into the memory;

a hard disk controller which sends/receives the image data to/from the direct memory access controller when reading/writing the image data from/into the memory and controls reading/writing of image data from/into the hard disk drives; and an image formation unit which forms an image based on the image data, wherein the hard disk controller controls setting of parameters, issuance of commands, and reading of statuses for said hard disk drives substantially at the same time, divides the image data into a plurality of pieces, and executes direct memory access transfer of the pieces of the image data to the hard disk drives substantially at the same time, and the hard disk controller includes a central processing unit-direct memory access interface unit which interfaces the central processing unit with the direct memory access controller, wherein the hard disk controller includes a plurality of hard disk drive interfaces having a state machine which generates access signals for command writing and status reading into and from the hard disk drive when the state machine receives an instruction from an central processing unit interface unit to perform reading/writing, and generates an interface signal for performing a direct memory access to the hard disk drives and executes the direct memory access transfer of the image data when the state machine receives an instruction from the central processing unit interface unit to initiate the direct memory access.

15. An image formation method applied to an image formation apparatus comprising an input unit, a memory, a direct memory access controller, a central processing unit, a plurality of hard disk drives, and a hard disk controller, the method comprising:

an input step in which the input unit acquires an image data;

a memory storage step in which the direct memory access controller writes the image data into the memory;

a transfer step in which the direct memory access controller reads the image data from the memory and transmits the image data to the hard disk controller; and a hard disk drive storage step in which the hard disk controller writes the image data, transferred from the direct memory access controller, into said hard disk drives;

wherein in the hard disk drive storage step, the hard disk controller controls setting of parameters and issuance of commands for said hard disk drives substantially at the same, time, divides the image data into a plurality of pieces, and executes the direct memory access transfer of the pieces of the image data to the hard disk drives substantially at the same time, and the hard disk controller includes a central processing unit-direct memory access interface unit which interfaces the central processing unit with the direct memory access controller, wherein said central processing unit-direct memory access interface unit has a central processing unit interface unit with a register inside, and a direct memory access interface unit, and said hard disk drive storage step includes a step of instructing initiation of direct memory access, the step in which the central processing unit interface unit decodes a command for direct memory access transfer, the command being set in the register by the central processing unit.

16. An image formation method applied to an image formation apparatus comprising an input unit, a memory, a direct memory access controller, a central processing unit, a plurality of hard disk drives, and a hard disk controller, the method comprising:

an input step in which the input unit acquires an image data;

a memory storage step in which the direct memory access controller writes the image data into the memory;

a transfer step in which the direct memory access controller reads the image data from the memory and transmits the image data to the hard disk controller; and a hard disk drive storage step in which the hard disk controller writes the image data, transferred from the direct memory access controller, into said hard disk drives;

wherein in the hard disk drive storage step, the hard disk controller controls setting of parameters and issuance of commands for said hard disk drives substantially at the same, time, divides the image data into a plurality of pieces, and executes the direct memory access transfer of the pieces of the image data to the hard disk drives substantially at the same time, and the hard disk controller includes a central processing unit-direct memory access interface unit which interfaces the central processing unit with the direct memory access controller, wherein said hard disk controller includes a plurality of hard disk drive interfaces, each of which independently reading/writing the image data from/into the corresponding one of said hard disk drives, said central processing unit-direct memory access interface unit has a central processing unit interface unit with a register inside, and a direct memory access interface unit, and said hard disk drive storage step includes a step in which the direct memory access interface unit divides the image data and transfers the divided image data to said hard disk drive interfaces when all of said hard disk drive interfaces are able to receive data.

17. An image formation method applied to an image formation apparatus comprising an input unit, a memory, a direct memory access controller, a central processing unit, a plurality of hard disk drives, and a hard disk controller, the method comprising:

an input step in which the input unit acquires an image data;

a memory storage step in which the direct memory access controller writes the image data into the memory;

a transfer step in which the direct memory access controller reads the image data from the memory and transmits the image data to the hard disk controller; and a hard disk drive storage step in which the hard disk controller writes the image data, transferred from the direct memory access controller, into said hard disk drives;

wherein in the hard disk drive storage step, the hard disk controller controls setting of parameters and issuance of commands for said hard disk drives substantially at the same, time, divides the image data into a plurality of pieces, and executes the direct memory access transfer of the pieces of the image data to the hard disk drives substantially at the same time, and the hard disk controller includes a central processing unit-direct memory access interface unit which interfaces the central processing unit with the direct memory access controller, wherein said central processing unit-direct memory access interface unit having a central processing unit interface unit with a register inside, and a direct memory access interface unit, and said hard disk controller includes a plurality of hard disk drive interfaces, each of which independently reading/writing the image data from/into the corresponding one of said hard disk drives, and each of which having a direct memory access data control unit, a buffer and a state machine, and the hard disk drive storage step includes a step in which the direct memory access data control unit in each of said hard disk drive interfaces sends the image data transferred from the direct memory access interface unit to the state machine after storing the image data into the buffer.

18. An image formation method applied to an image formation apparatus comprising an input unit, a memory, a direct memory access controller, a central processing unit, a plurality of hard disk drives, and a hard disk controller, the method comprising:

an input step in which the input unit acquires an image data;

a memory storage step in which the direct memory access controller writes the image data into the memory;

a transfer step in which the direct memory access controller reads the image data from the memory and transmits the image data to the hard disk controller; and a hard disk drive storage step in which the hard disk controller writes the image data, transferred from the direct memory access controller, into said hard disk drives;

wherein in the hard disk drive storage step, the hard disk controller controls setting of parameters and issuance of commands for said hard disk drives substantially at the same, time, divides the image data into a plurality of pieces, and executes the direct memory access transfer of the pieces of the image data to the hard disk drives substantially at the same time, and the hard disk controller includes a central processing unit-direct memory access interface unit which interfaces the central processing unit with the direct memory access controller, wherein said central processing unit-direct memory access interface unit having a central processing unit interface unit with a register inside, and a direct memory access interface unit, and said hard disk controller includes a plurality of hard disk drive interfaces, each of which independently reading/writing the image data from/into the corresponding one of said hard disk drives, and each of which having a direct memory access data control unit, a buffer and a state machine, and the hard disk drive storage step includes a step in which the state machine in each of said hard disk drive interfaces generates a direct memory access interface signal for said hard disk drives to execute direct memory access transfer of the image data, when the state machine receives an instruction from the central processing unit interface unit to initiate direct memory access.

* * * * *